(12) United States Patent
Yamai

(10) Patent No.: US 12,290,191 B2
(45) Date of Patent: May 6, 2025

(54) BEVERAGE CONTAINER AND LID PORTION

(71) Applicant: Snow Peak, Inc., Niigata (JP)

(72) Inventor: Lisa Yamai, Niigata (JP)

(73) Assignee: Snow Peak, Inc., Niigata (JP)

(*) Notice: Subject to any disclaimer, the term of this patent is extended or adjusted under 35 U.S.C. 154(b) by 30 days.

(21) Appl. No.: 17/954,812

(22) Filed: Sep. 28, 2022

(65) Prior Publication Data
US 2023/0128545 A1 Apr. 27, 2023

Related U.S. Application Data

(63) Continuation-in-part of application No. PCT/JP2021/038919, filed on Oct. 21, 2021.

(51) Int. Cl.
B65D 51/16 (2006.01)
A47G 19/22 (2006.01)
(Continued)

(52) U.S. Cl.
CPC ..... *A47G 19/2272* (2013.01); *B65D 51/1633* (2013.01); *B65D 51/18* (2013.01);
(Continued)

(58) Field of Classification Search
CPC ... A47G 19/2272; A47J 41/00; A47J 41/0022; A47J 41/02; B65D 2251/0018; B65D 2251/0081; B65D 47/24; B65D 51/1633; B65D 51/1644; B65D 51/1683; B65D 51/18; B65D 55/12; B65D 77/225; B65D 81/2038; B65D 85/72; B65D 1/02;
(Continued)

(56) References Cited

U.S. PATENT DOCUMENTS 3,739,938 A * 6/1973 Paz .................. B65D 47/248
D7/510
5,037,015 A * 8/1991 Collins .............. A47J 41/0027
222/472
(Continued)

FOREIGN PATENT DOCUMENTS

JP 2013124117 A * 6/2013 ............ B65D 47/20
JP 5354063 B1 * 11/2013 .......... A47J 41/0027
(Continued)

*Primary Examiner* — Anthony D Stashick
*Assistant Examiner* — Marcos Javier Rodriguez Molina
(74) *Attorney, Agent, or Firm* — Burr & Forman LLP

(57) ABSTRACT

A beverage container includes a main body portion for accommodating a beverage and a lid portion provided on the upper portion of the main body portion, the lid portion includes a beverage opening portion (312) for discharging the beverage and a beverage opening and closing portion side sealing material (324) for opening and closing the beverage opening portion (312) from the lower side of the beverage opening portion (312), the lid portion further includes a gas opening portion (313) provided separately from the beverage opening portion (312) and for taking outside air into the main body portion in a case where the beverage accommodated in the main body portion is discharged and a gas opening and closing portion side sealing material (325) for opening and closing the gas opening portion (313) from the lower side of the gas opening portion (313).

4 Claims, 24 Drawing Sheets

(51) Int. Cl.
*B65D 51/18* (2006.01)
*B65D 85/72* (2006.01)

(52) U.S. Cl.
CPC ...... *B65D 85/72* (2013.01); *B65D 2251/0018* (2013.01); *B65D 2251/0081* (2013.01)

(58) Field of Classification Search
CPC .. B65D 1/0207; B65D 1/0238; B65D 1/0246; B65D 1/08; B65D 1/12; B65D 1/16; B65D 1/24; B65D 1/265; B65D 1/32; B65D 1/48; B65D 11/02; B65D 17/28; B65D 17/30; B65D 17/4014; B65D 17/506; B65D 21/02; B65D 21/0204; B65D 21/0217; B65D 21/0219; B65D 21/0231; B65D 21/062; B65D 21/066; B65D 2203/02; B65D 2203/04; B65D 2203/12; B65D 2205/00; B65D 2217/00; B65D 2231/02; B65D 2251/0003; B65D 2251/0012; B65D 2251/0021; B65D 2251/0025; B65D 2251/0031; B65D 2251/0056; B65D 2251/0078; B65D 2251/009; B65D 2251/0093; B65D 2251/023; B65D 2251/026; B65D 2251/1008; B65D 2251/1016; B65D 2251/1041; B65D 2251/105; B65D 2251/1075; B65D 2251/1091; B65D 2255/00; B65D 23/00; B65D 23/06; B65D 23/08; B65D 23/10; B65D 23/102; B65D 2313/04; B65D 2401/00; B65D 2401/20; B65D 2401/25; B65D 2401/45; B65D 25/00; B65D 25/08; B65D 25/10; B65D 25/205; B65D 25/22; B65D 25/282; B65D 25/2841; B65D 25/2894; B65D 25/2897; B65D 25/32; B65D 25/42; B65D 25/44; B65D 25/46; B65D 25/54; B65D 25/56; B65D 2517/0013; B65D 2517/0014; B65D 2517/004; B65D 2517/0041; B65D 2517/0046; B65D 2517/0049; B65D 2517/0092; B65D 2517/0094; B65D 2517/5083; B65D 2519/00034; B65D 2519/00164; B65D 2519/00273; B65D 2519/00323; B65D 2519/00333; B65D 2519/00805; B65D 2519/009; B65D 2539/006; B65D 2543/00009; B65D 2543/00027; B65D 2543/00046; B65D 2543/00194; B65D 2543/00231; B65D 2543/00277; B65D 2543/00296; B65D 2543/00314; B65D 2543/00342; B65D 2543/00351; B65D 2543/00379; B65D 2543/00407; B65D 2543/00435; B65D 2543/0049; B65D 2543/00509; B65D 2543/00518; B65D 2543/00527; B65D 2543/00537; B65D 2543/00546; B65D 2543/00555; B65D 2543/0062; B65D 2543/00629; B65D 2543/00638; B65D 2543/00648; B65D 2543/00685; B65D 2543/00694; B65D 2543/00731; B65D 2543/0074; B65D 2543/00759; B65D 2543/00768; B65D 2543/00796; B65D 2543/00805; B65D 2543/00814; B65D 2543/00833; B65D 2543/00842; B65D 2543/00851; B65D 2543/00888; B65D 2543/00953; B65D 2543/00972; B65D 2543/0099; B65D 2547/063; B65D 2547/066; B65D 2565/385; B65D 2575/583; B65D 2575/586; B65D 2581/3404; B65D 2581/3437; B65D 2583/005; B65D 2585/6817; B65D 2590/0091; B65D 2590/046; B65D 3/06; B65D 3/20; B65D 3/30; B65D 31/12; B65D 33/00; B65D 33/004; B65D 33/007; B65D 33/16; B65D 33/1675; B65D 35/20; B65D 35/28; B65D 35/285; B65D 35/36; B65D 35/44; B65D 37/00; B65D 39/00; B65D 39/0005; B65D 39/0052; B65D 39/04; B65D 39/08; B65D 39/084; B65D 39/088; B65D 39/12; B65D 39/16; B65D 41/00; B65D 41/005; B65D 41/02; B65D 41/04; B65D 41/0407; B65D 41/0414; B65D 41/0428; B65D 41/0435; B65D 41/0442; B65D 41/045; B65D 41/0457; B65D 41/0464; B65D 41/0471; B65D 41/0485; B65D 41/0492; B65D 41/06; B65D 41/065; B65D 41/08; B65D 41/086; B65D 41/10; B65D 41/16; B65D 41/18; B65D 41/26; B65D 41/28; B65D 41/32; B65D 41/325; B65D 41/34; B65D 41/3404; B65D 41/3409; B65D 41/3423; B65D 41/3428; B65D 41/3442; B65D 41/3447; B65D 41/38; B65D 41/465; B65D 41/48; B65D 41/485; B65D 41/56; B65D 41/62; B65D 43/00; B65D 43/02; B65D 43/0202; B65D 43/0204; B65D 43/0208; B65D 43/0212; B65D 43/0214; B65D 43/0216; B65D 43/022; B65D 43/0225; B65D 43/0229; B65D 43/0231; B65D 43/0233; B65D 43/0258; B65D 43/06; B65D 43/14; B65D 43/16; B65D 43/161; B65D 43/162; B65D 43/163; B65D 43/164; B65D 43/165; B65D 43/166; B65D 43/169; B65D 43/18; B65D 43/20; B65D 43/22; B65D 43/24; B65D 43/26; B65D 43/265; B65D 43/267; B65D 45/00; B65D 45/16; B65D 45/18; B65D 45/20; B65D 45/24; B65D 45/322; B65D 45/327; B65D 47/00; B65D 47/02; B65D 47/04; B65D 47/043; B65D 47/046; B65D 47/06; B65D 47/061; B65D 47/063; B65D 47/065; B65D 47/066; B65D 47/068; B65D 47/08; B65D 47/0804; B65D 47/0809; B65D 47/0814; B65D 47/0828; B65D 47/0838; B65D 47/0842; B65D 47/0847; B65D 47/0852; B65D 47/0857; B65D 47/0861; B65D 47/0866; B65D 47/0871; B65D 47/0876; B65D 47/088; B65D 47/0885; B65D 47/089; B65D 47/0895; B65D 47/10; B65D 47/103; B65D 47/106; B65D 47/12; B65D 47/121; B65D 47/122; B65D 47/123; B65D 47/125; B65D 47/127; B65D 47/141; B65D 47/18; B65D 47/185; B65D 47/20; B65D 47/2006; B65D 47/2012; B65D 47/2018; B65D 47/2025; B65D 47/2031; B65D 47/2037; B65D 47/2043; B65D 47/2068; B65D 47/2081; B65D 47/242; B65D 47/243; B65D 47/244; B65D 47/245; B65D 47/246; B65D 47/247; B65D 47/248; B65D 47/249; B65D 47/26; B65D 47/266; B65D 47/268; B65D 47/30; B65D 47/305; B65D 47/40; B65D 47/42; B65D 5/00; B65D 5/40; B65D 5/46104; B65D 5/74; B65D 5/746; B65D 5/747; B65D 50/04; B65D 50/041; B65D 50/06; B65D 50/061; B65D 51/04; B65D 51/10; B65D 51/1611; B65D 51/1616; B65D 51/165; B65D 51/1661; B65D 51/1688; B65D 51/185; B65D 51/20; B65D 51/22; B65D 51/227; B65D 51/228; B65D 51/24; B65D 51/245; B65D 51/246; B65D 51/247; B65D 51/26; B65D 51/28; B65D 51/2807; B65D 51/2828; B65D 51/2835; B65D 51/2864; B65D 51/2878; B65D 51/2892; B65D 53/02; B65D 53/04; B65D 55/022; B65D 55/024; B65D 55/16; B65D 65/46; B65D 65/466; B65D 75/008; B65D 75/20; B65D 75/5861; B65D 75/5877; B65D 75/04; B65D 77/0466; B65D 77/048; B65D 77/061; B65D 77/065; B65D 77/067; B65D 77/28; B65D 81/00; B65D 81/18; B65D 81/2076; B65D 81/22; B65D 81/24; B65D 81/266; B65D 81/267; B65D 81/268; B65D 81/3205; B65D 81/3211; B65D 81/3227; B65D 81/3255; B65D 81/3288; B65D 81/34; B65D 81/3453; B65D 81/3813; B65D 81/3816; B65D 81/3834; B65D 81/3837; B65D 81/3841; B65D 81/3869; B65D 81/3874; B65D 81/3886; B65D 83/00; B65D 83/0094; B65D 83/06; B65D 83/08; B65D 83/141; B65D 83/16; B65D 83/22; B65D 83/24; B65D 83/267; B65D 83/30; B65D 83/384; B65D 83/386; B65D 83/46; B65D 83/48; B65D 83/60; B65D 83/62; B65D 83/682; B65D 83/72; B65D 83/756; B65D 83/76; F16K 17/00

USPC .... 206/139, 219, 221, 222, 427, 459.1, 467, 206/503, 508, 524.8, 541, 549, 562, 5, 6, 206/7, 8, 815, 1.5, 119, 140, 143, 144, 206/145; 215/10, 11.1, 11.3, 11.4, 11.5, 215/11.6, 12.1, 12.2, 14, 17, 18, 19, 2, 215/200, 207, 209, 21, 216, 22, 223, 225, 215/227, 11.2, 13.1, 15, 16, 20, 201, 203, 215/204; 220/200, 201, 202, 203.01, 220/203.04, 203.05, 203.06, 203.07, 220/203.08, 203.09, 203.1, 203.11, 220/203.13, 203.16, 203.17, 203.19, 220/203.2, 203.23, 203.26, 203.27, 220/203.28, 203.29, 210, 212, 212.5, 214, 220/227, 23.83, 231, 232, 234, 237, 238, 220/240, 246, 251, 253, 254.1, 254.2, 220/254.3, 254.4, 254.6, 254.7, 254.8, 220/254.9, 255, 256.1, 258.2, 258.3, 220/258.5, 259.3, 259.4, 259.5, 260, 262, 220/264, 268, 269, 270, 271, 273, 274, 220/276, 277, 278, 281, 284, 287, 288, 220/293, 298, 303, 304, 310.1, 315, 316, 220/318, 319, 320, 323, 324, 325, 345.1, 220/345.2, 345.4, 345.6, 348, 359.1, 360, 220/361, 363, 364, 366.1, 367.1, 369, 220/371, 372, 373, 374, 375, 378, 380, 220/4.12, 4.34, 500, 501, 502, 504, 506, 220/521, 523, 524, 529, 567.2, 569, 574, 220/574.2, 577, 580, 581, 585, 592.01, 220/592.16, 592.17, 592.2, 592.27, 601, 220/606, 62.12, 624, 628, 632, 633, 648, 220/658, 661, 662, 666, 675, 703, 705, 220/707, 708, 709, 710.5, 711, 712, 713, 220/714, 715, 716, 717, 719, 720, 722, 220/724, 725, 727, 728, 735, 745, 752, 220/754, 755, 756, 759, 763, 764, 768, 220/770, 780, 789, 790, 791, 795, 796, 220/799, 801, 802, 803, 804, 805, 806, 220/811, 820, 821, 822, 825, 826, 830, 220/832, 833, 834, 835, 836, 837, 838, 220/840, 847, 849, 86.2, 89.1, DIG. 19, 220/DIG. 27, DIG. 32, DIG. 33, 33; 222/525; 251/11, 205, 304, 331; 99/275, 99/276, 277.1, 279, 282, 283, 285, 287, 99/295, 297, 304, 307, 312, 316, 319, 99/323.1, 323.2, 325, 326, 327, 330, 331, 99/332, 334, 336, 337, 339, 340, 341, 99/345, 348, 350, 352, 355, 356, 357, 99/360, 367, 371, 375, 389, 391, 400, 99/401, 403, 404, 407, 408, 409, 410, 99/411, 412, 413, 414, 415, 419, 423, 99/427, 443 C, 444, 446, 448, 449, 450, 99/452, 453, 454, 455, 467, 468, 477, 99/478, 479, 482, 483, 485, 486, 489, 99/516, DIG. 10; 224/148.2, 191, 920, 224/922

See application file for complete search history.

(56) References Cited

U.S. PATENT DOCUMENTS

| | | | |
|---|---|---|---|
| 2018/0065784 A1* | 3/2018 | Cote, Sr. | A47G 19/2272 |
| 2018/0118417 A1* | 5/2018 | Smaldone | B65D 47/247 |
| 2019/0352059 A1* | 11/2019 | Mutch | A47J 41/0022 |
| 2020/0055646 A1* | 2/2020 | Harris | A45F 3/16 |
| 2021/0300661 A1* | 9/2021 | Chen | B65B 31/047 |

FOREIGN PATENT DOCUMENTS

| | | | | |
|---|---|---|---|---|
| JP | 5457523 B2 * | 4/2014 | | A47J 41/0027 |
| JP | 2020171369 A * | 10/2020 | | A47J 41/02 |
| JP | 2021106863 A | 7/2021 | | |
| WO | WO-2007122648 A1 * | 11/2007 | | A47J 36/027 |

* cited by examiner

[Fig. 1]
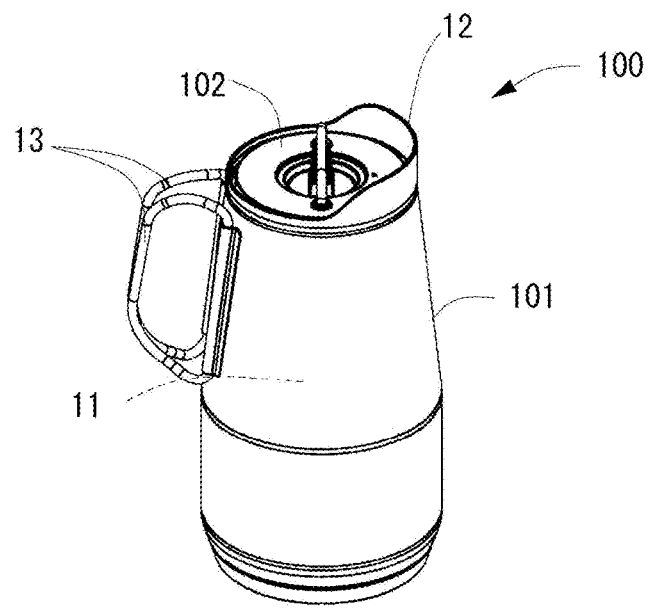
[Fig. 2]
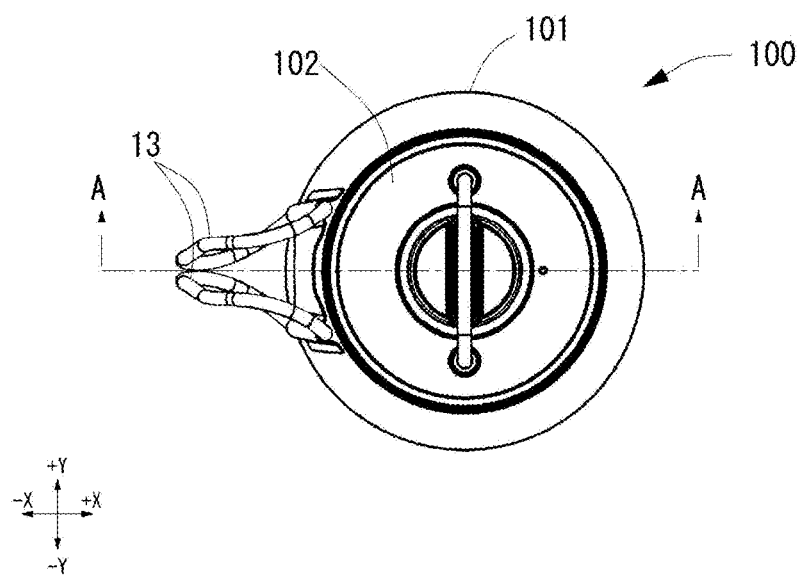

[Fig. 3]
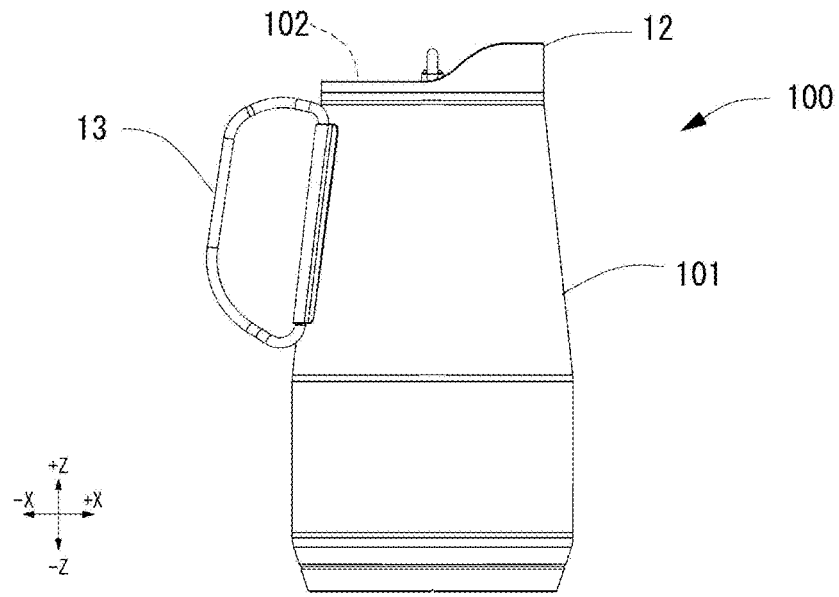
[Fig. 4]
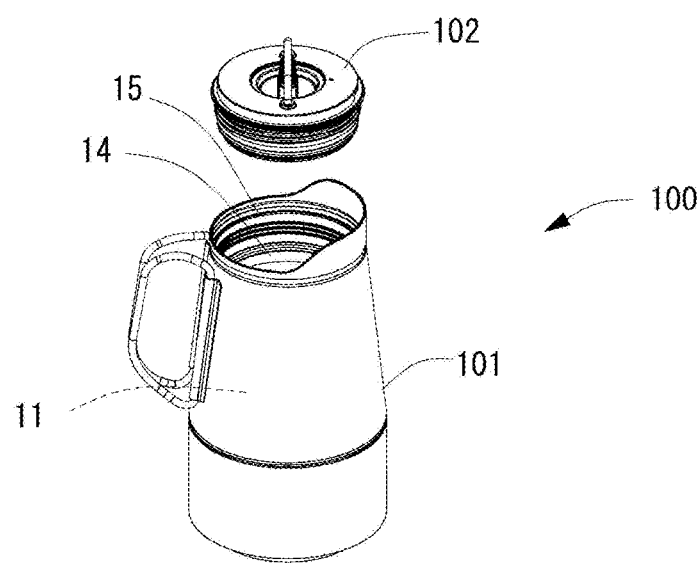

[Fig. 5]
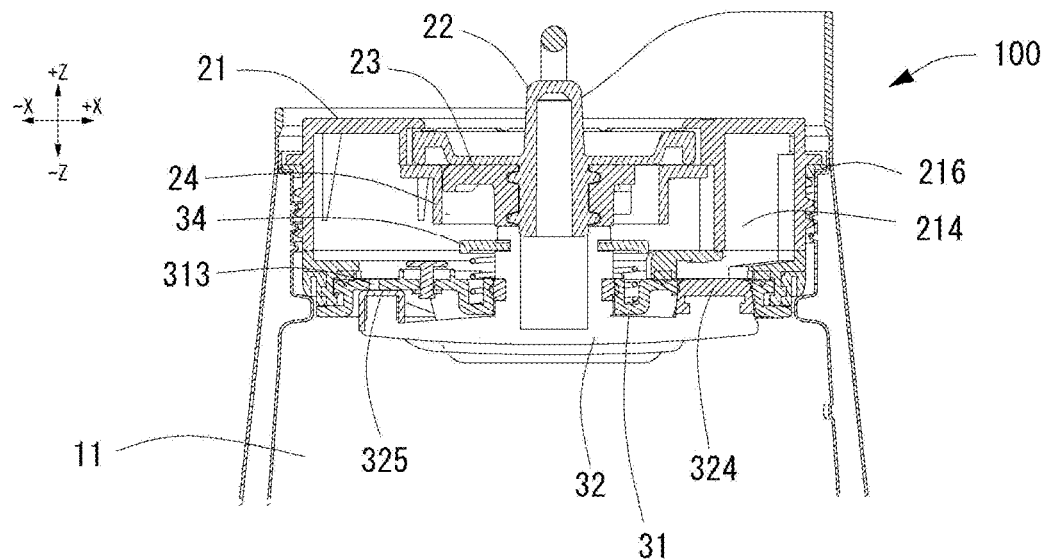
[Fig. 6]
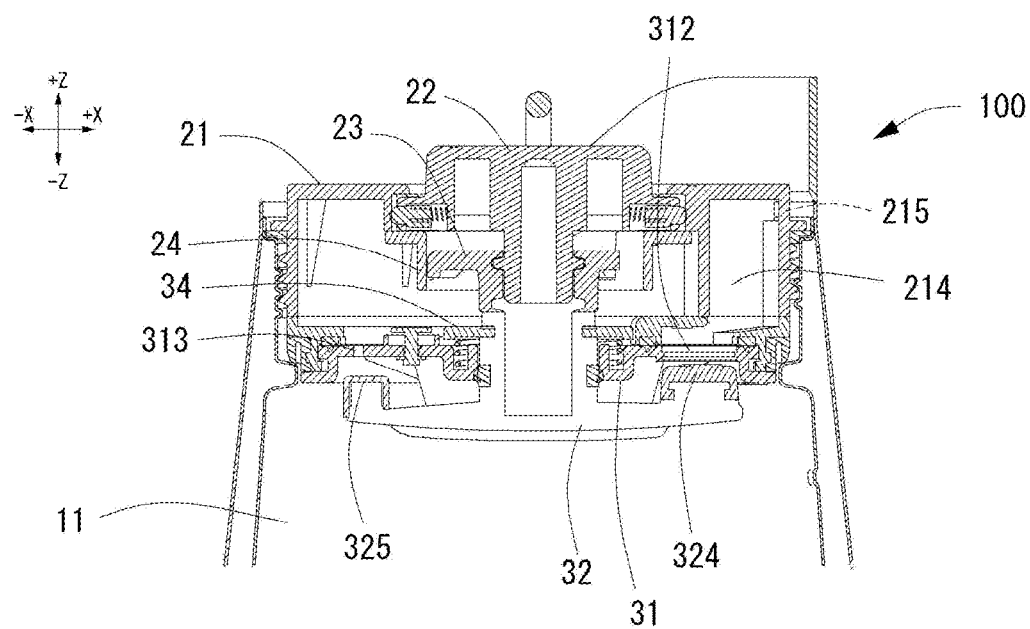

[Fig. 7]
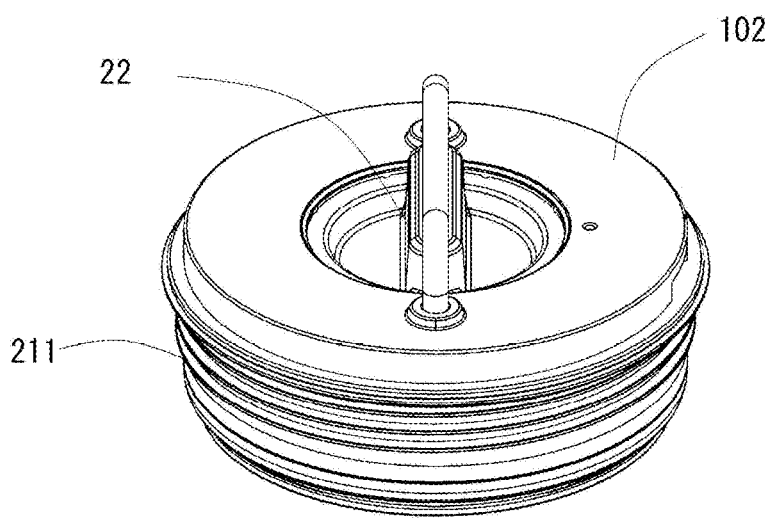
[Fig. 8]
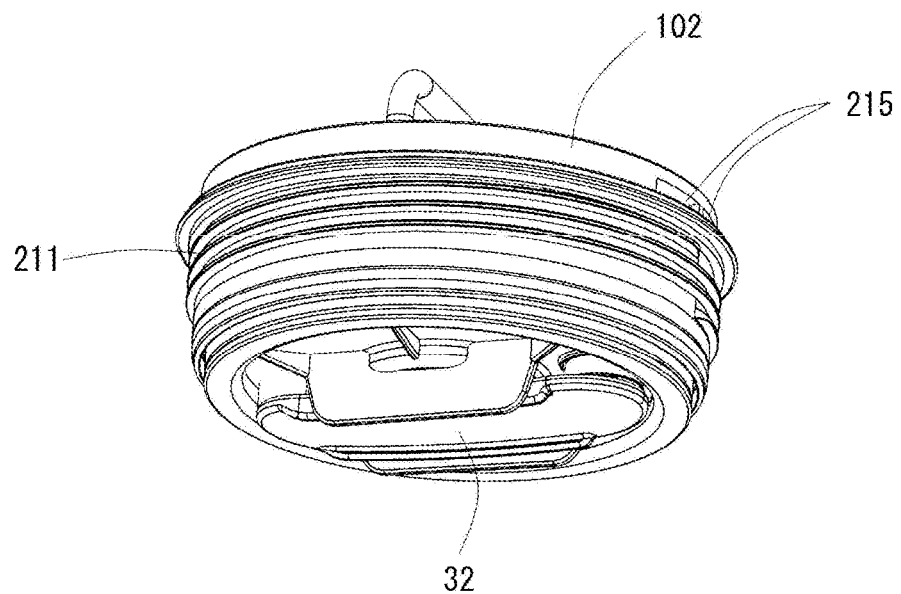

[Fig. 9]
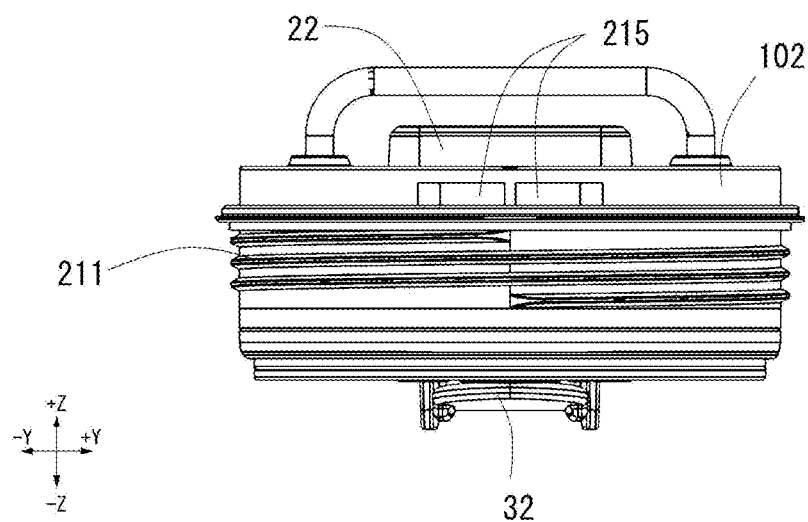
[Fig. 10]
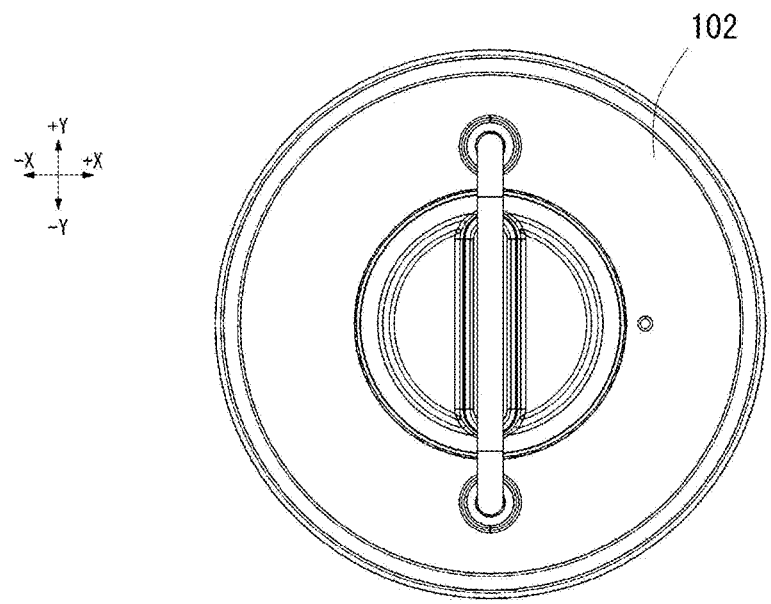

[Fig. 11]
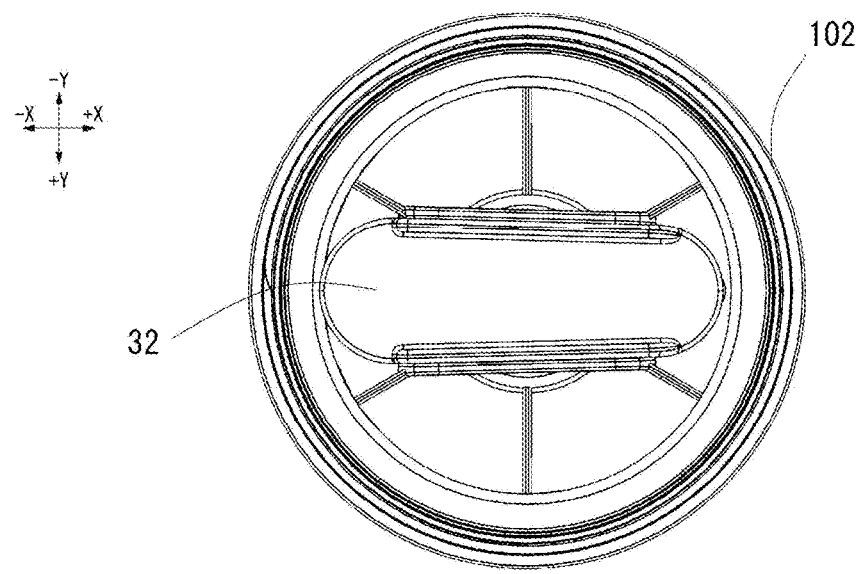
[Fig. 12]
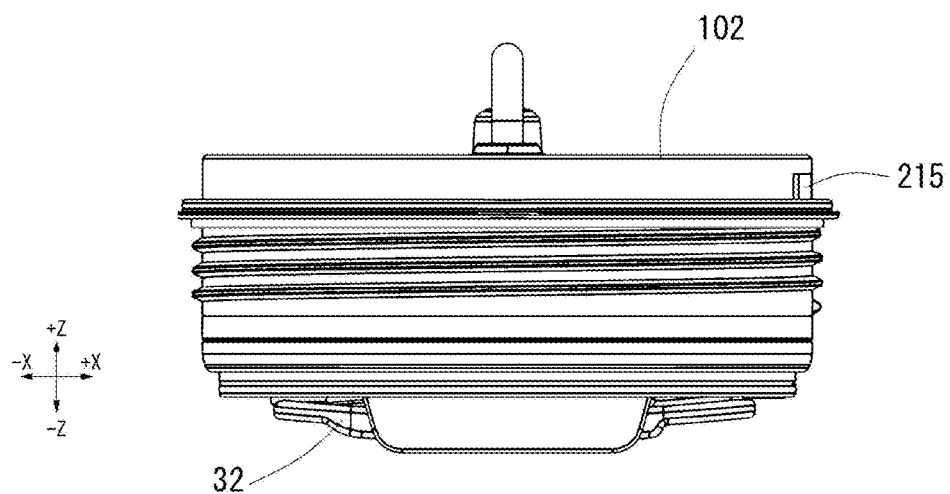

[Fig. 13]
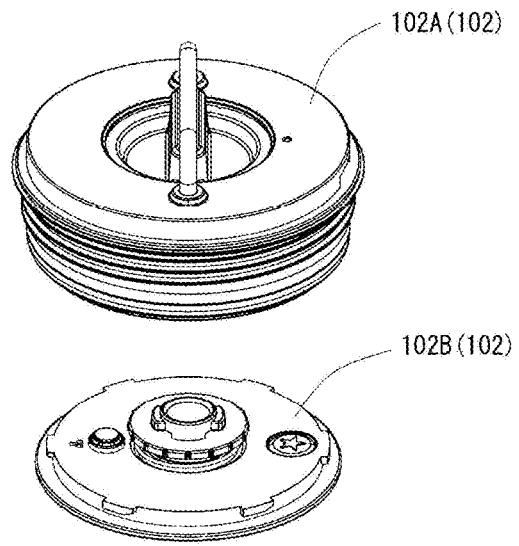
[Fig. 14]
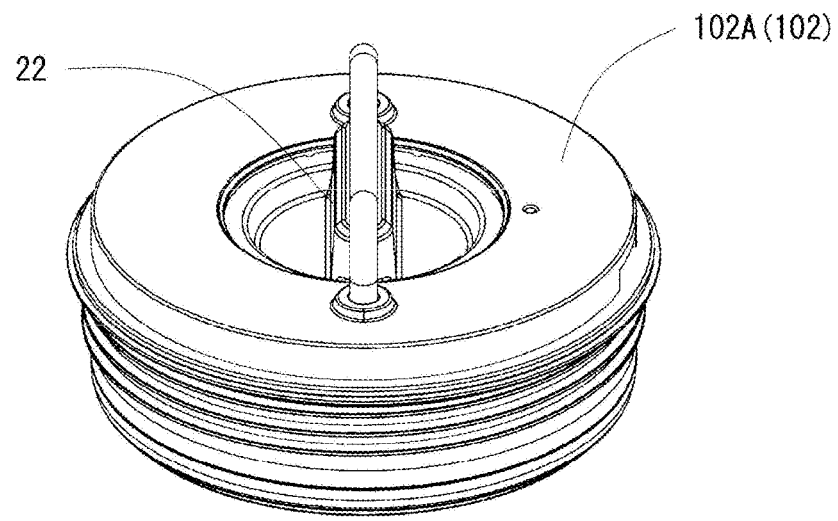

[Fig. 15]
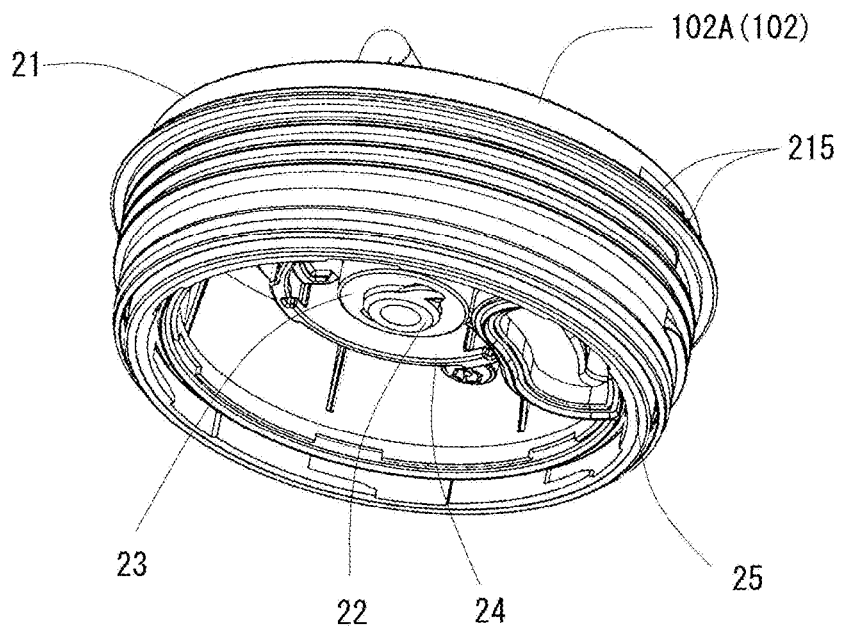
[Fig. 16]
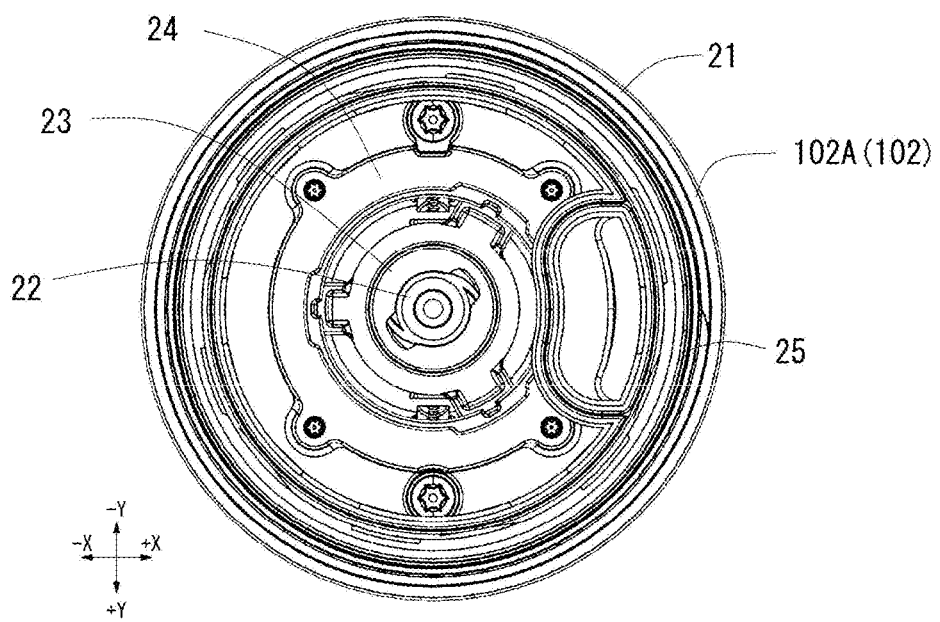

[Fig. 17]
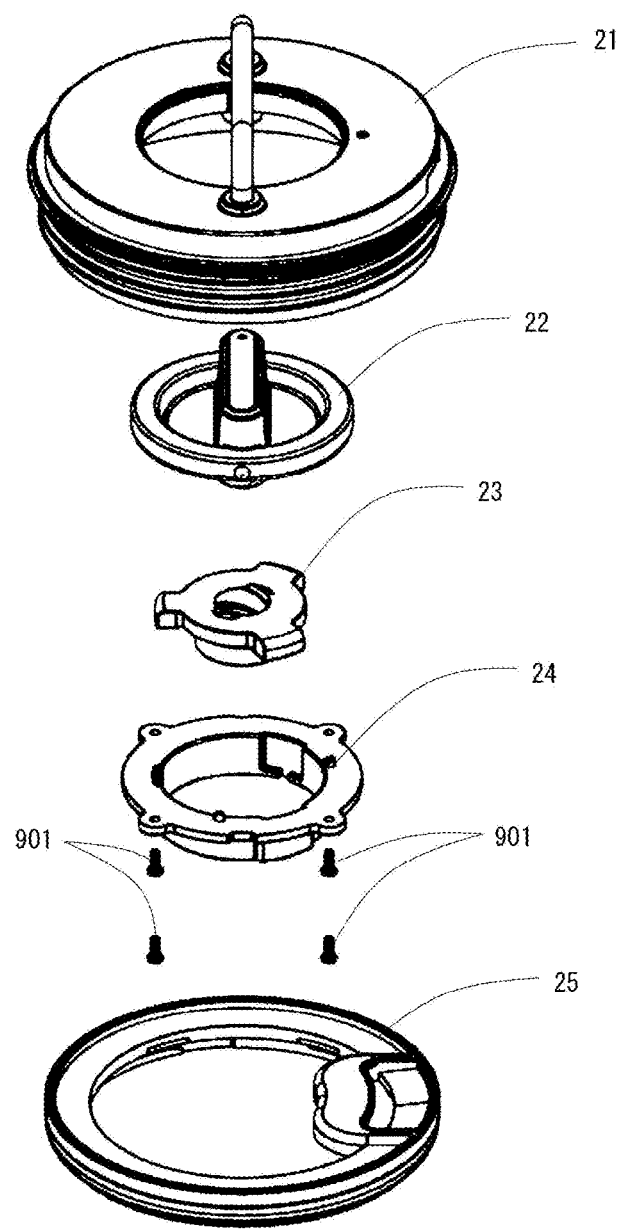

[Fig. 18]
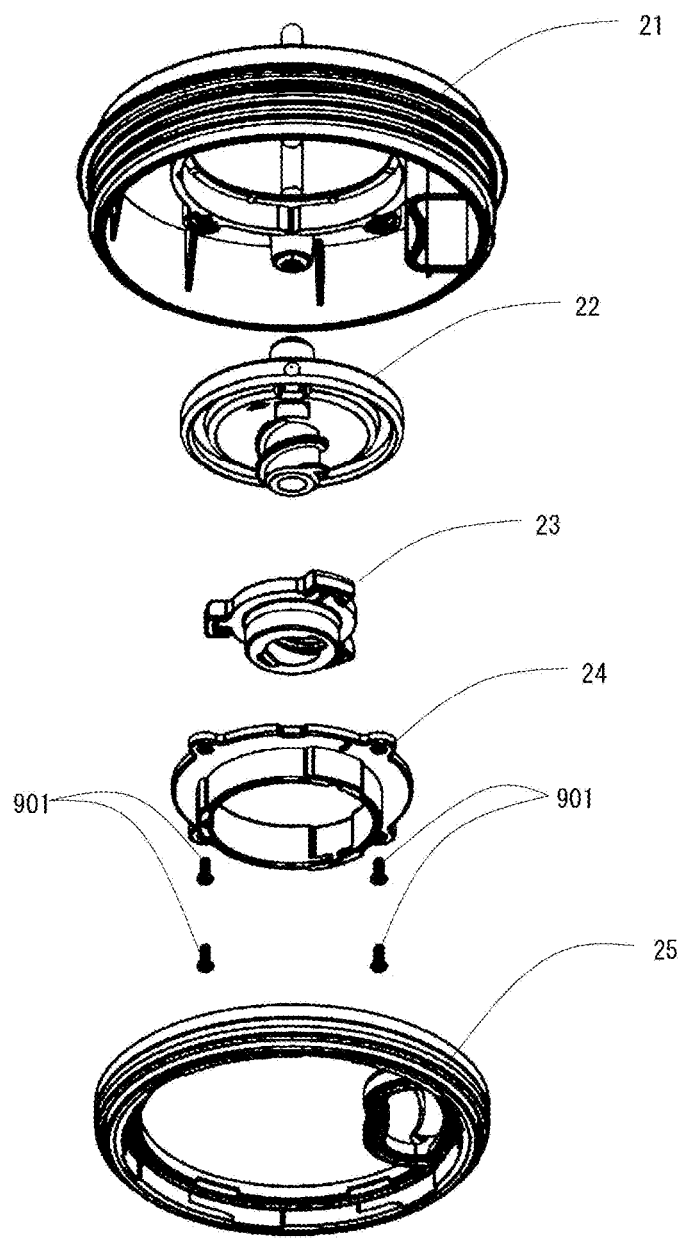

[Fig. 19]
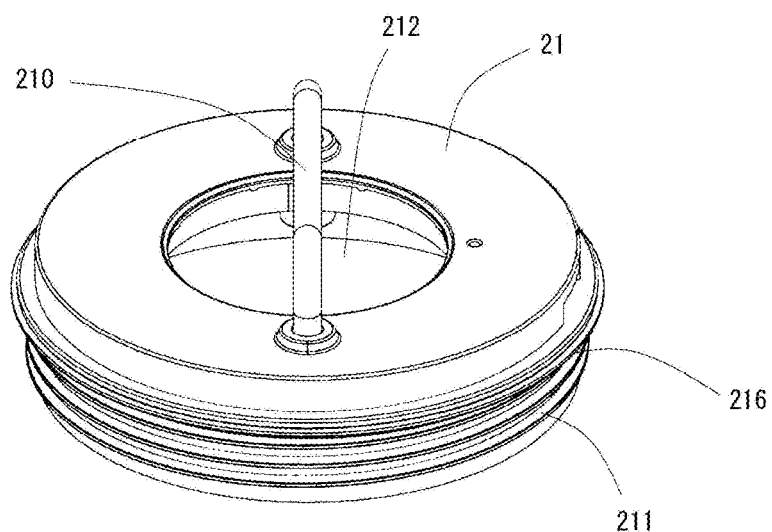
[Fig. 20]
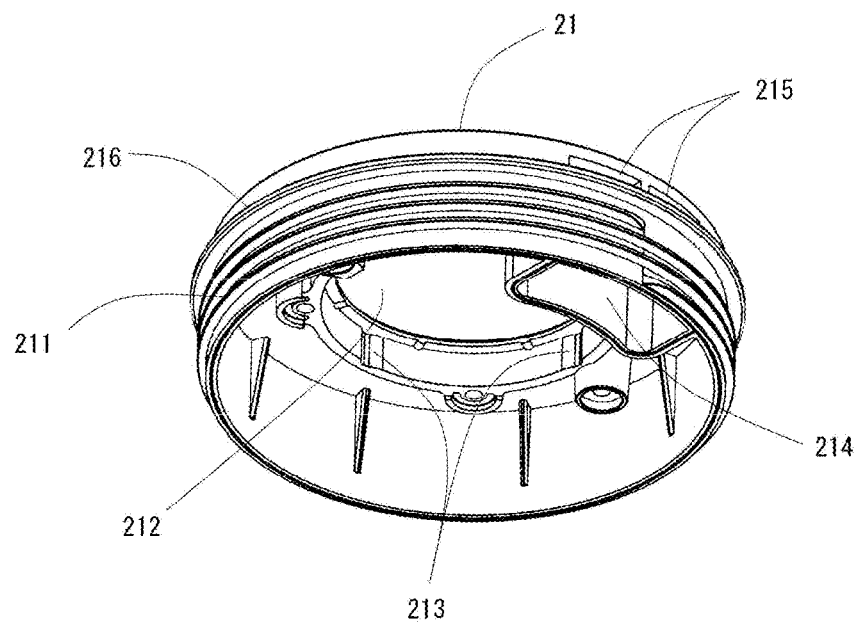

[Fig. 21]
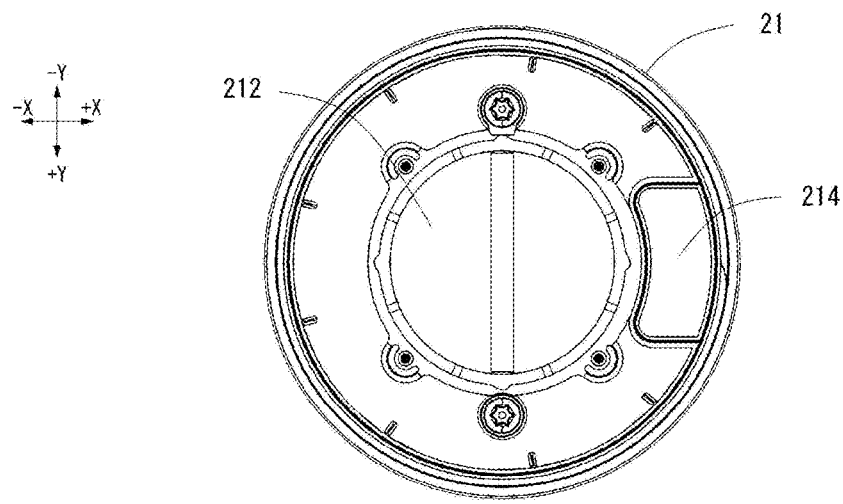
[Fig. 22]
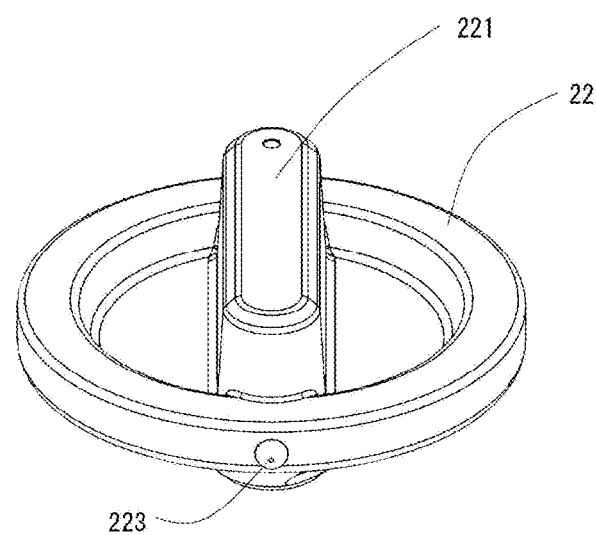

[Fig. 23]
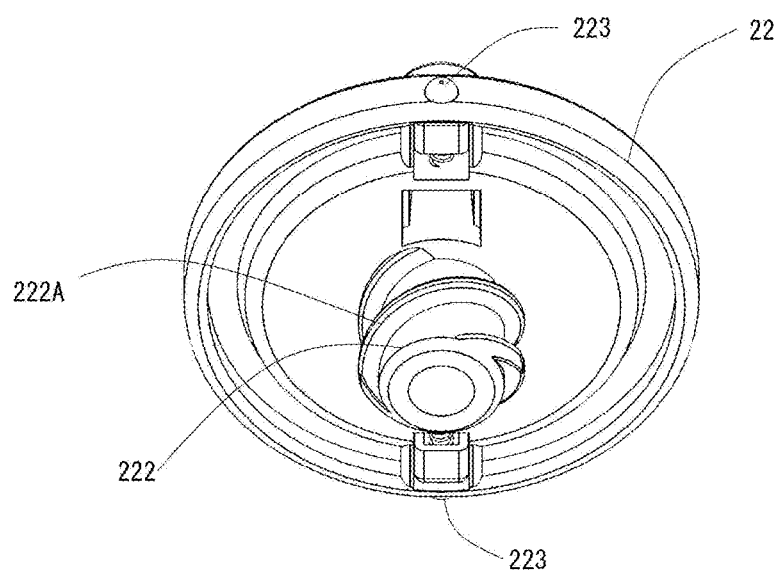
[Fig. 24]
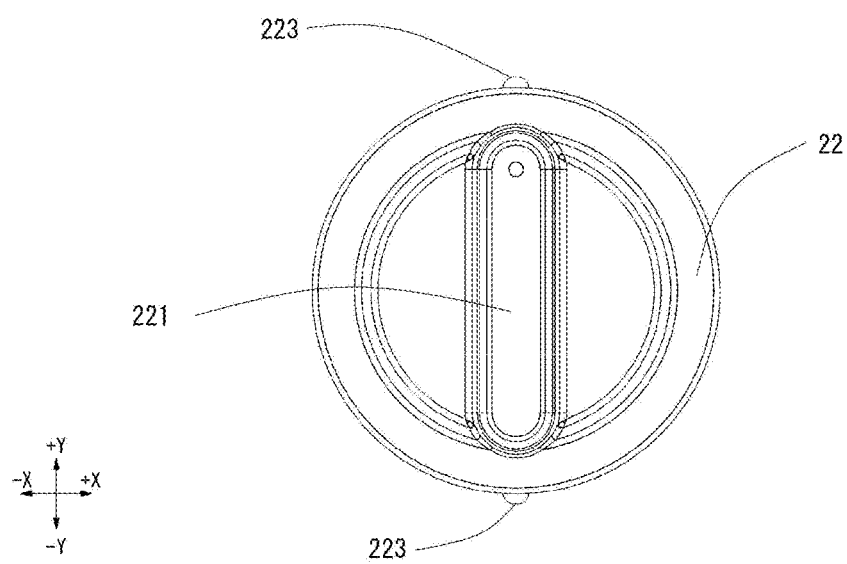

[Fig. 25]
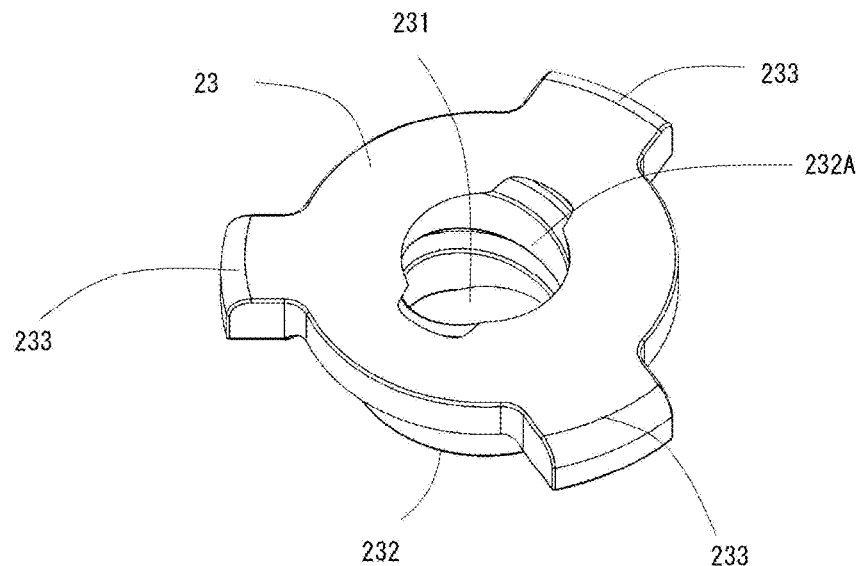
[Fig. 26]
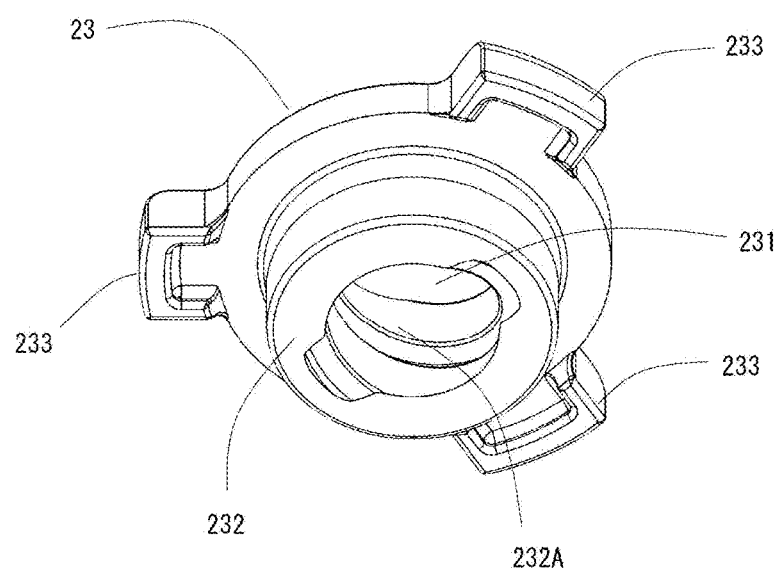

[Fig. 27]
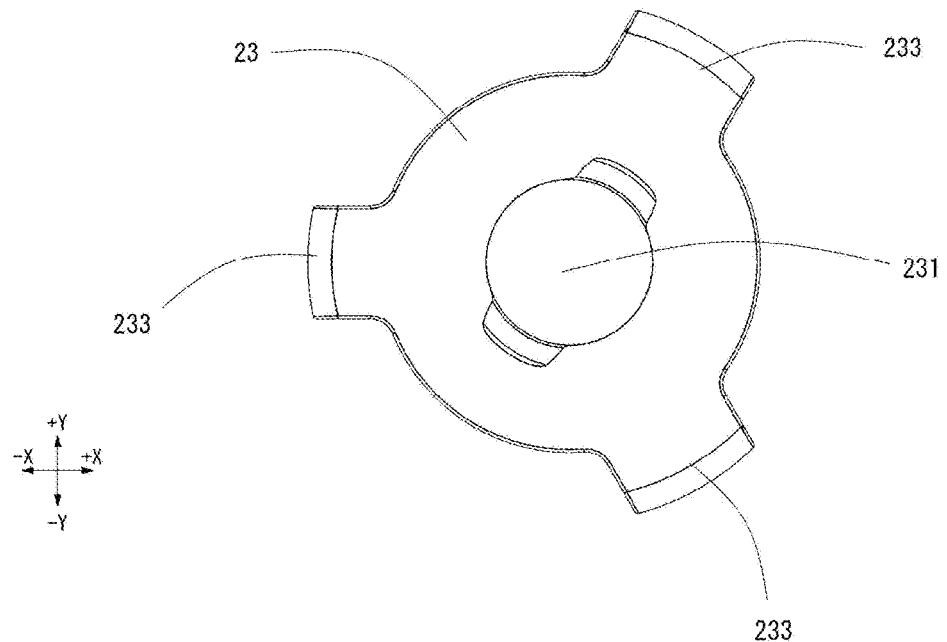
[Fig. 28]
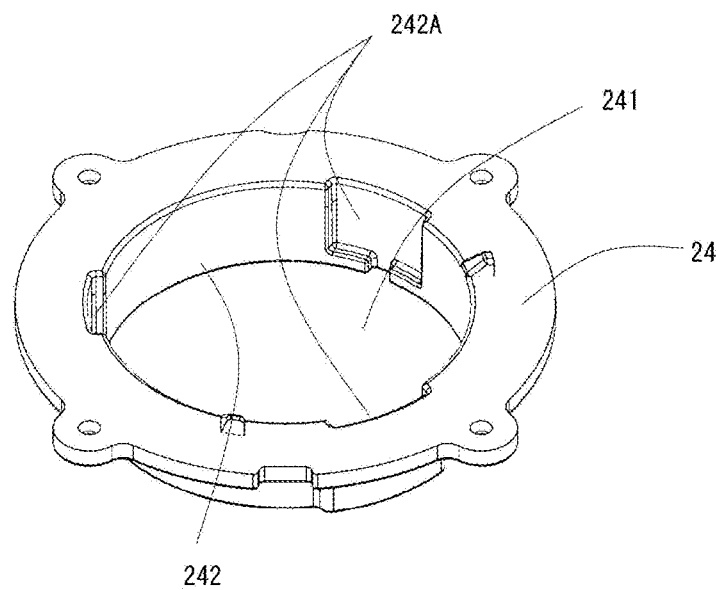

[Fig. 29]
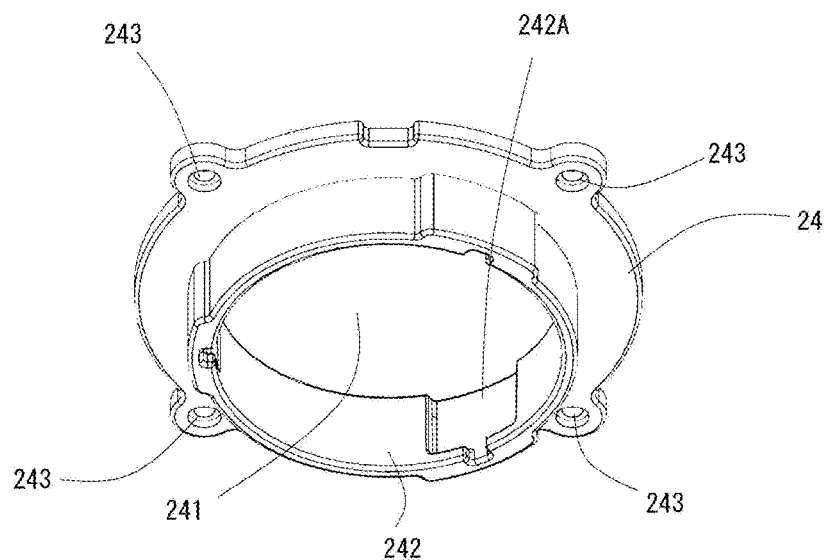
[Fig. 30]
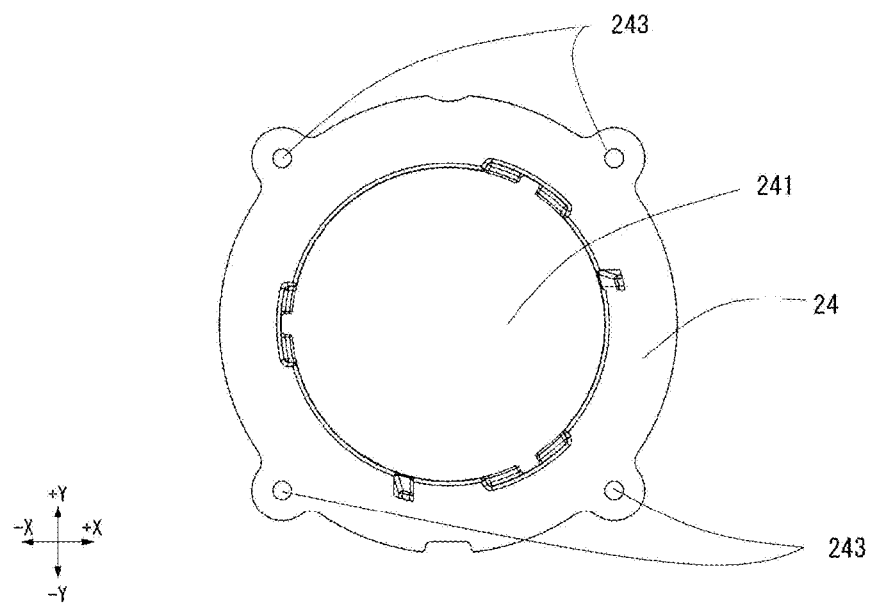

[Fig. 31]
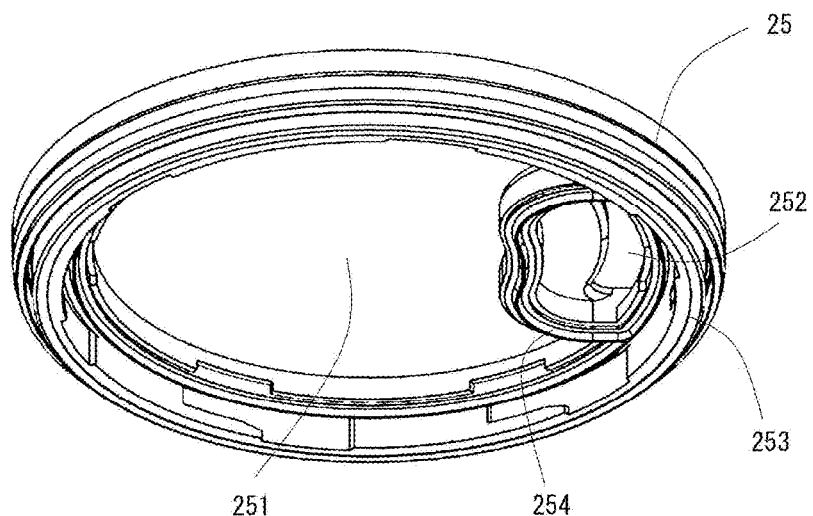
[Fig. 32]
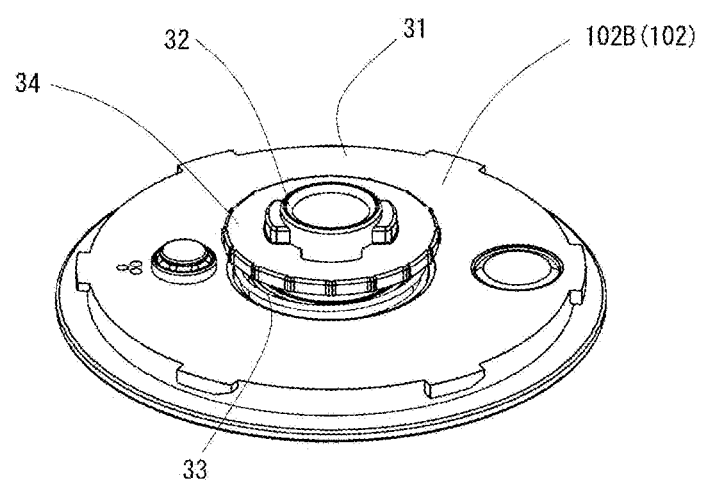

[Fig. 33]
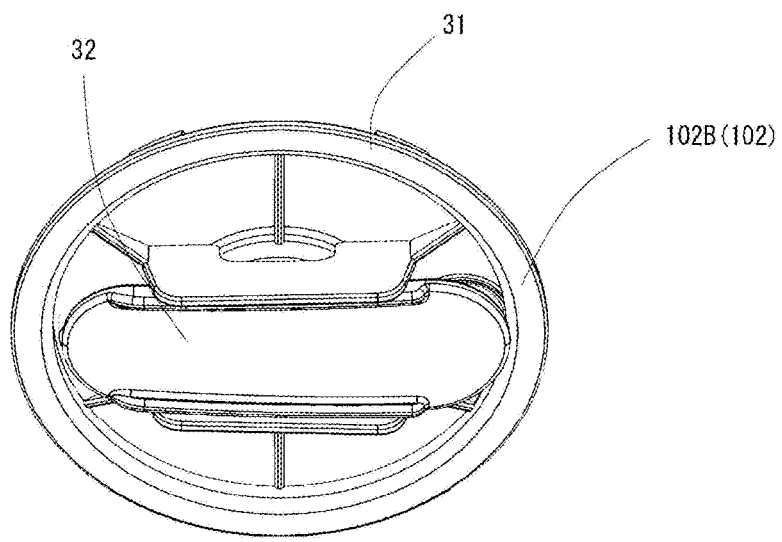
[Fig. 34]
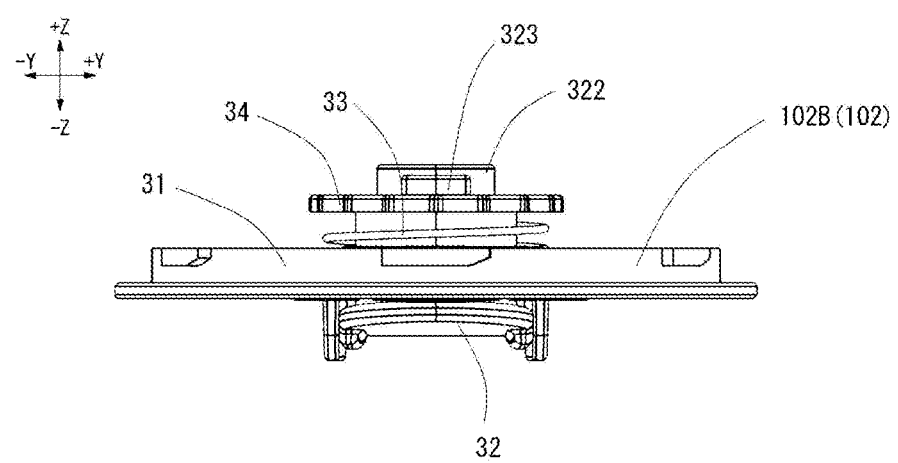

[Fig. 35]
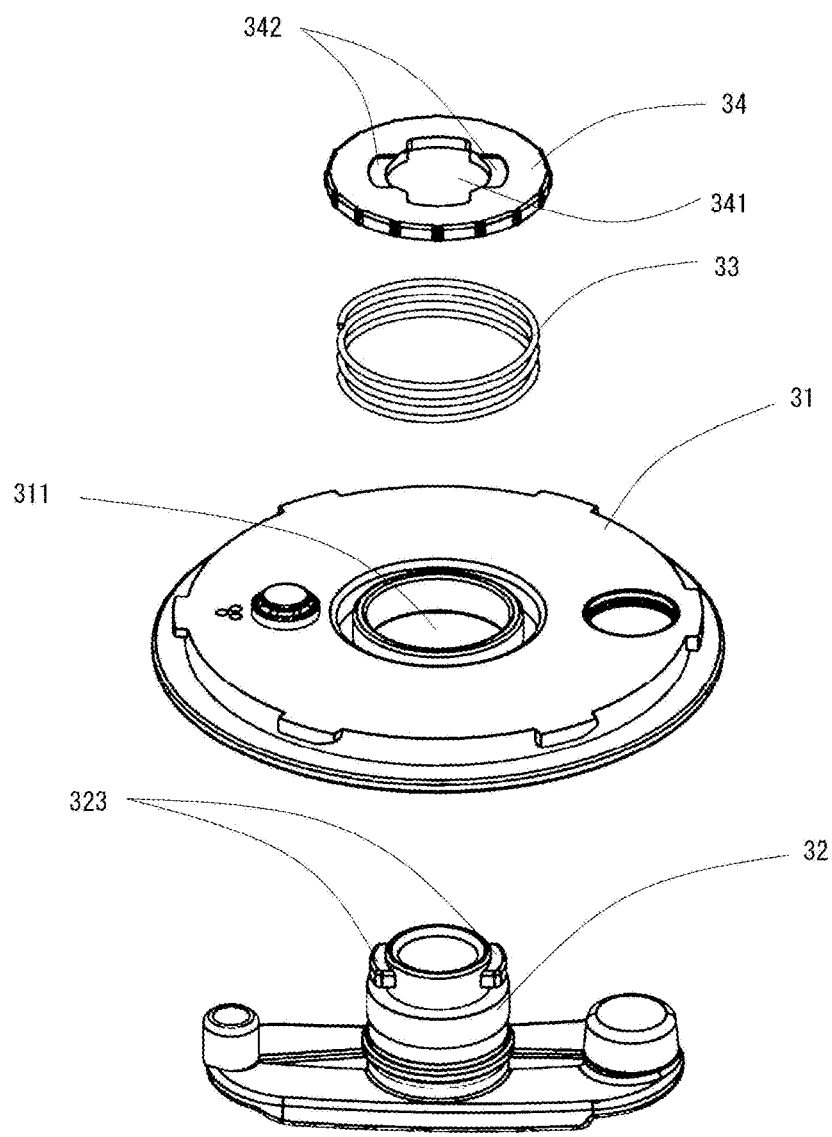

[Fig. 36]
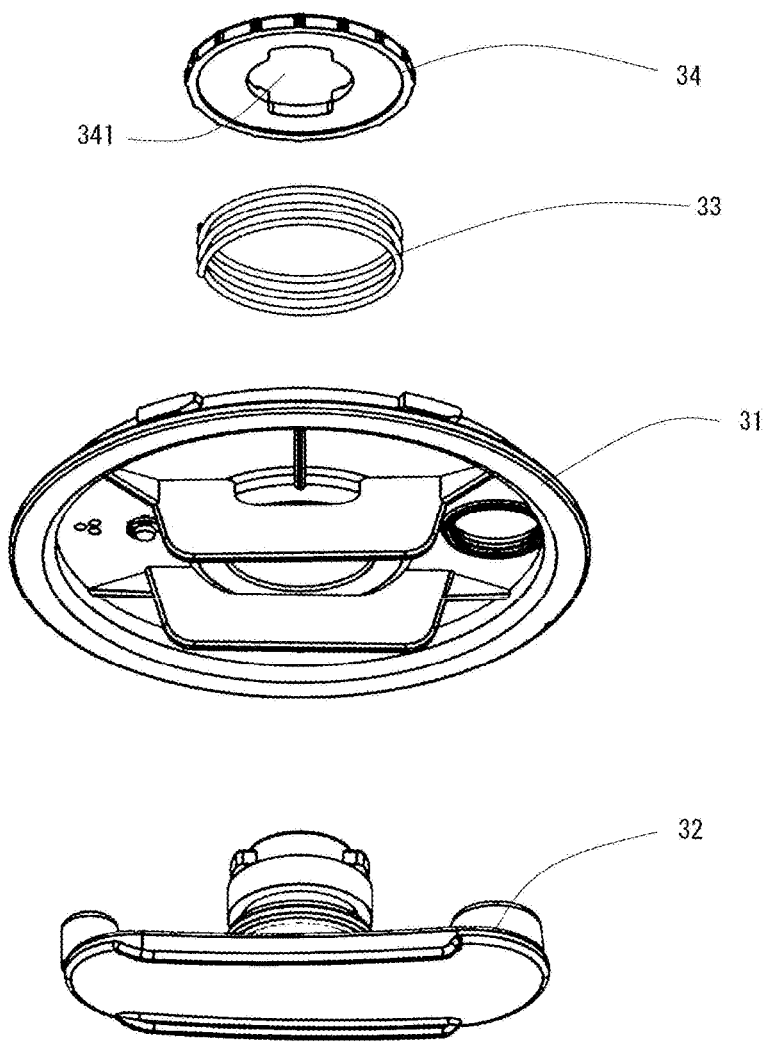

[Fig. 37]
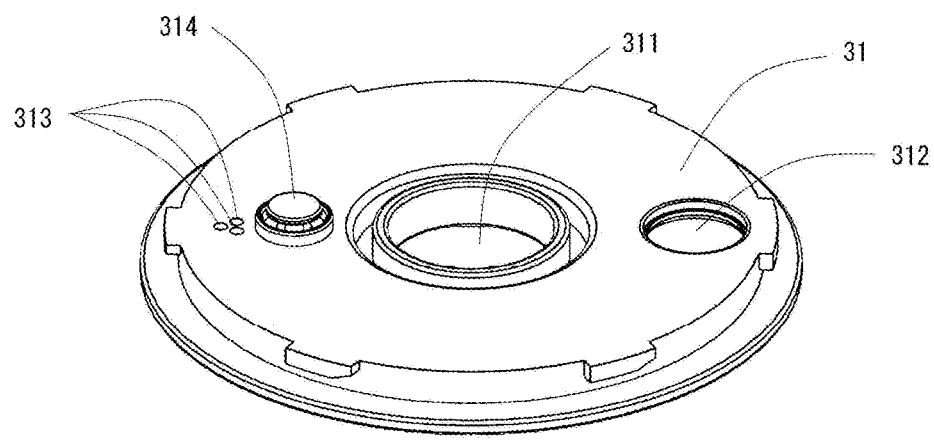
[Fig. 38]
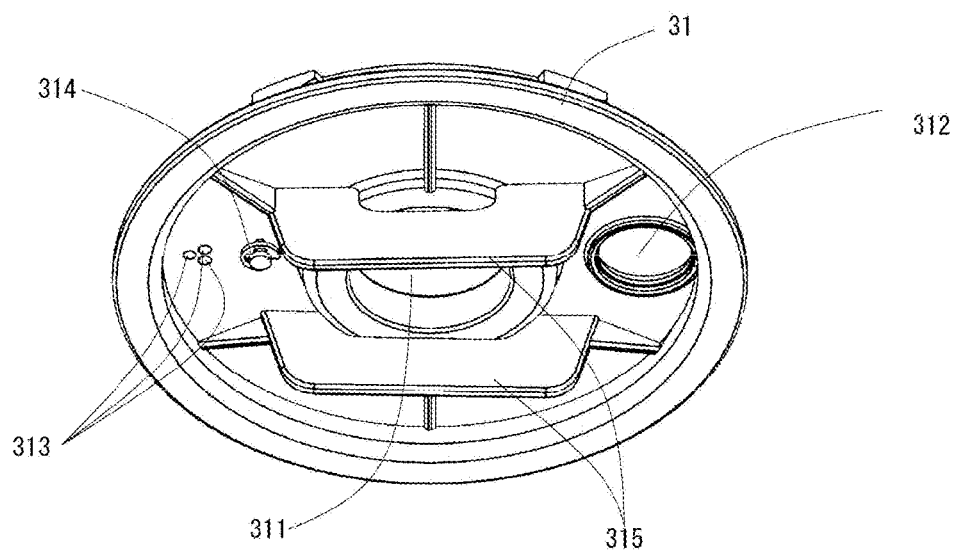

[Fig. 39]
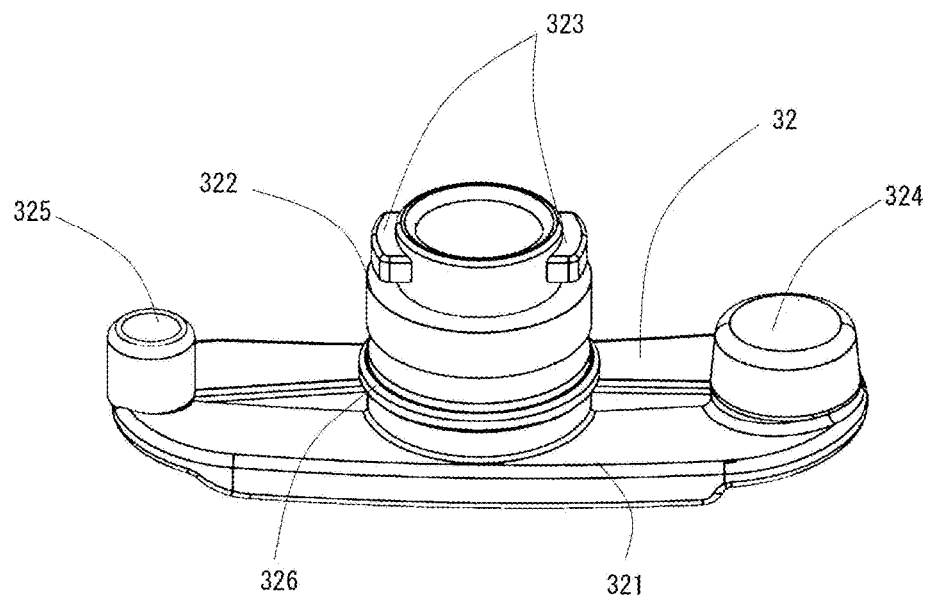
[Fig. 40]
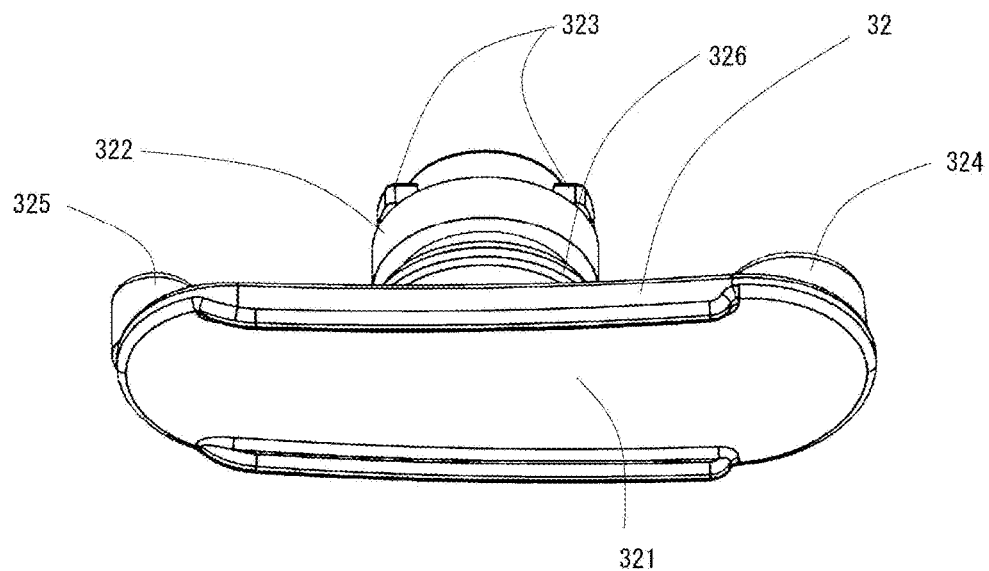

[Fig. 41]
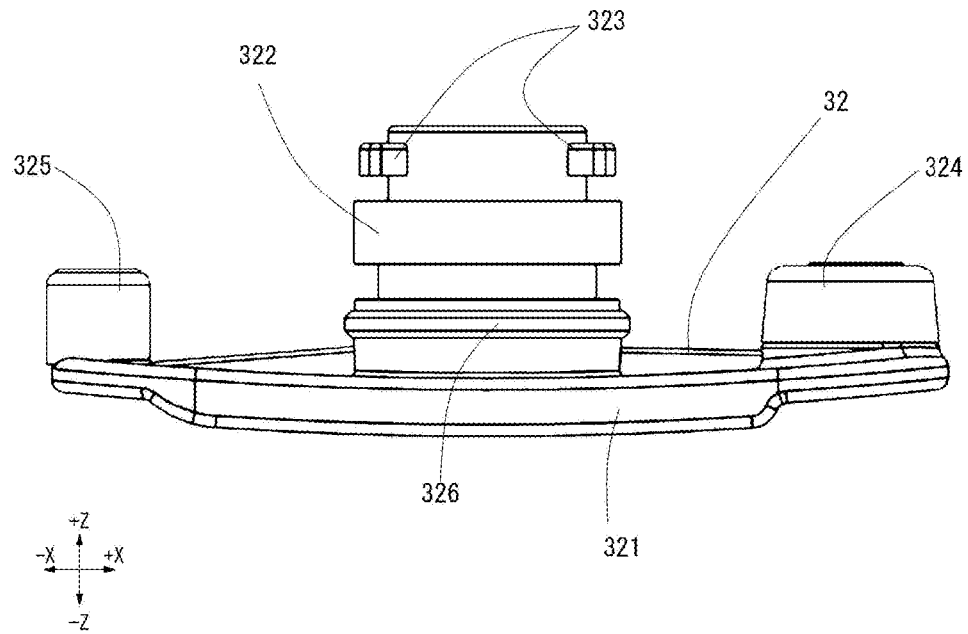
[Fig. 42]
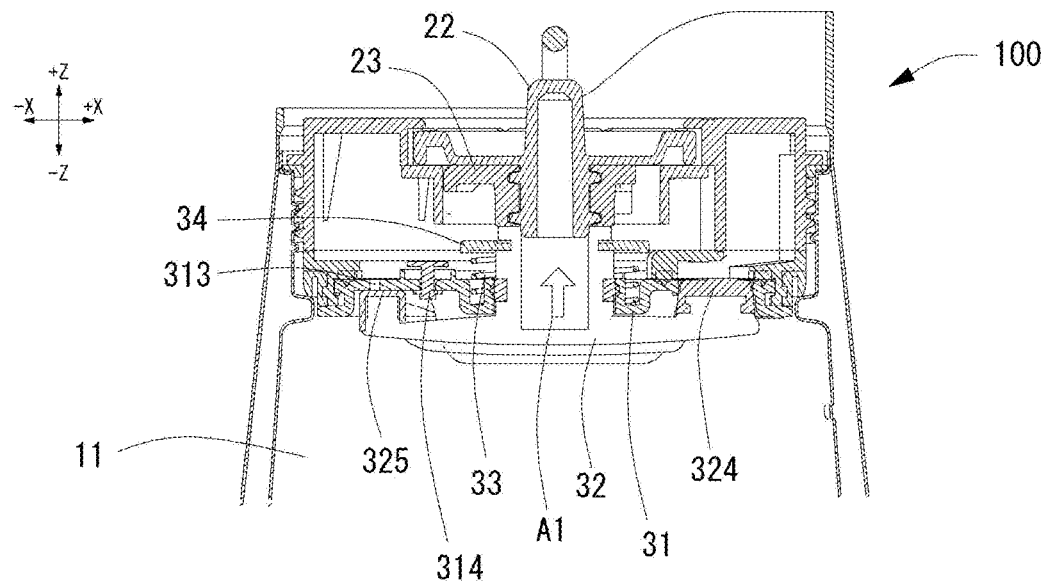

[Fig. 43]
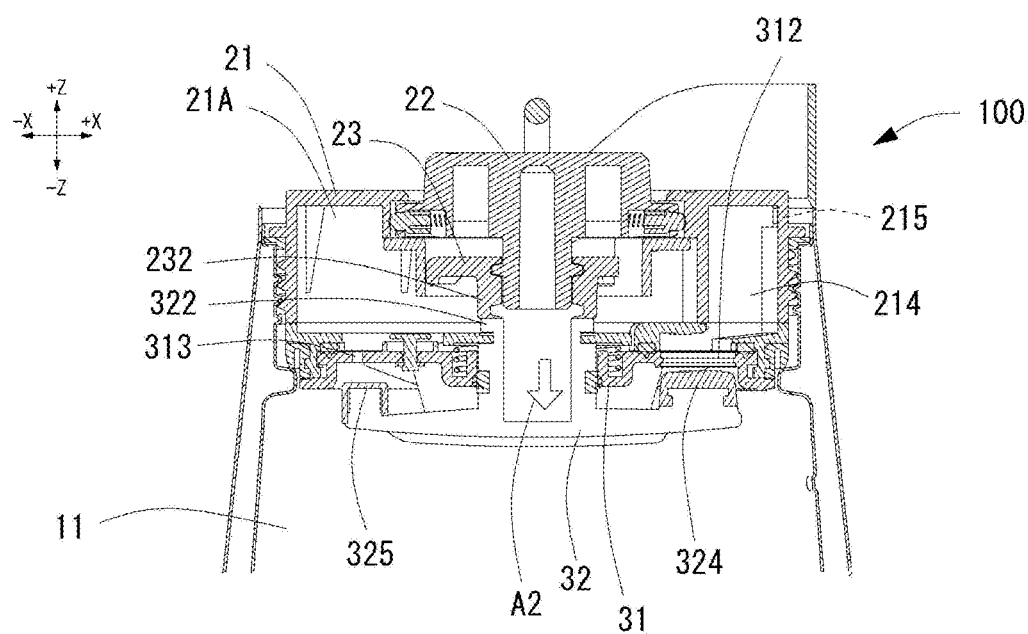

BEVERAGE CONTAINER AND LID PORTION

The present application claims the benefit of the benefit of PCT application No. PCT/JP2021/038919 filed on Oct. 21, 2021, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a beverage container and a lid portion.

BACKGROUND ART

Beverage containers accommodating beverages are known in the related art (see, for example, Patent Document 1).

CITATION LIST

Patent Document

Patent Document 1: Japanese Unexamined Patent Application Publication No. 2021-106863

SUMMARY OF THE INVENTION

Technical Problem

By the way, there has been a demand for a technique for making a beverage accommodated in a beverage container dischargeable or non-dischargeable in accordance with a user's intention.

It is an object of the present invention to solve the problems of the above mentioned prior arts.

Solution to Problem

One aspect of the present invention provides a beverage container comprises: an accommodating portion for accommodating a beverage; and a lid portion provided on an upper portion of the accommodating portion, wherein the lid portion includes: a beverage opening portion for discharging the beverage accommodated in the accommodating portion; and a beverage opening and closing member for opening and closing the beverage opening portion from a lower side of the beverage opening portion.

Another aspect of the present invention provides a lid portion of a beverage container including an accommodating portion for accommodating a beverage and the lid portion provided on an upper portion of the accommodating portion, the lid portion comprises: a beverage opening portion for discharging the beverage accommodated in the accommodating portion; and a beverage opening and closing member for opening and closing the beverage opening portion from a lower side of the beverage opening portion.

BRIEF DESCRIPTION OF THE DRAWINGS

FIG. 1 is a perspective view of a beverage container.
FIG. 2 is a plan view of the beverage container.
FIG. 3 is a side view of the beverage container.
FIG. 4 is an exploded perspective view of the beverage container.
FIG. 5 is a cross-sectional view of a part of the beverage container.
FIG. 6 is a cross-sectional view of a part of the beverage container.
FIG. 7 is a perspective view of a lid portion seen from above.
FIG. 8 is a perspective view of the lid portion seen from below.
FIG. 9 is a front view of the lid portion.
FIG. 10 is a plan view of the lid portion.
FIG. 11 is a bottom view of the lid portion.
FIG. 12 is a side view of the lid portion.
FIG. 13 is an exploded perspective view of the lid portion.
FIG. 14 is a perspective view of a first part seen from above.
FIG. 15 is a perspective view of the first part seen from below.
FIG. 16 is a bottom view of the first part.
FIG. 17 is an exploded perspective view of the first part seen from above.
FIG. 18 is an exploded perspective view of the first part seen from below.
FIG. 19 is a perspective view of a main body member seen from above.
FIG. 20 is a perspective view of the main body member seen from below.
FIG. 21 is a bottom view of the main body member.
FIG. 22 is a perspective view of an operating member seen from above.
FIG. 23 is a perspective view of the operating member seen from below.
FIG. 24 is a plan view of the operating member.
FIG. 25 is a perspective view of an adjusting member seen from above.
FIG. 26 is a perspective view of the adjusting member seen from below.
FIG. 27 is a plan view of the adjusting member.
FIG. 28 is a perspective view of a guide member seen from above.
FIG. 29 is a perspective view of the guide member seen from below.
FIG. 30 is a plan view of the guide member.
FIG. 31 is a perspective view of a connecting member seen from below.
FIG. 32 is a perspective view of a second part seen from above.
FIG. 33 is a perspective view of the second part seen from below.
FIG. 34 is a front view of the second part.
FIG. 35 is an exploded perspective view of the second part seen from above.
FIG. 36 is an exploded perspective view of the second part seen from below.
FIG. 37 is a perspective view of a partition member seen from above.
FIG. 38 is a perspective view of the partition member seen from below.
FIG. 39 is a perspective view of a moving member seen from above.
FIG. 40 is a perspective view of the moving member seen from below.
FIG. 41 is a side view of the moving member.
FIG. 42 is a cross-sectional view of a part of a beverage container.

FIG. 43 is a cross-sectional view of a part of a beverage container.

MODE FOR CARRYING OUT THE INVENTION

Hereinafter, an embodiment of the beverage container and the lid portion according to the invention will be described in detail with reference to the drawings. It should be noted that the invention is not limited by the embodiment.

Basic Concept of Embodiment

First, the basic concept of the embodiment will be described. The embodiment schematically relates to a beverage container and a lid portion.

The "beverage container" is a container for accommodating a beverage. The "beverage" is for drinking and, specifically, is a concept including a liquid for drinking. Any beverage is accommodated in the beverage container. The beverage is a concept including, for example, effervescent beverages or other beverages (including non-effervescent beverages). As an example, the beverage is a concept including carbonated drinks (including beer or the like), teas, water, hot water, or the like.

Further, in the following embodiment, a case where the "beverage" is a carbonated drink (that is, an effervescent beverage) will be described.

Specific Content of Embodiment

Next, the specific content of the embodiment will be described.

Configuration

First, the configuration of the beverage container of the present embodiment will be described. FIG. 1 is a perspective view of the beverage container, FIG. 2 is a plan view of the beverage container, FIG. 3 is a side view of the beverage container, FIG. 4 is an exploded perspective view of the beverage container, and FIGS. 5 and 6 are cross-sectional views of a part of the beverage container.

It should be noted that FIGS. 5 and 6 are cross-sectional views of the A-A cross section in FIG. 2, FIG. 5 illustrates a state where a beverage opening portion 312 (described later) and a gas opening portion 313 (described later) are closed, and FIG. 6 illustrates a state where each of the opening portions is open. It should be noted that in FIGS. 5 and 6, hatching is omitted in part as to a moving member 32 (described later). In addition, in FIGS. 5 and 6, a handle 13 in FIG. 1 is not illustrated.

It should be noted that in each of the drawings, a plurality of elements mutually identical in configuration may be described with a representative reference numeral on a part of the elements. In addition, in each of the drawings and the following description, it is assumed that the X, Y, and Z axes are mutually orthogonal, the Z axis indicates the vertical direction, and the X axis and the Y axis indicate the horizontal direction. In addition, the +Z direction is also referred to as an upper side (upper portion, flat surface), and the –Z direction is also referred to as a lower side (lower portion, bottom surface). In addition, the +X direction is also referred to as a front side, and the –X direction is also referred to as a back side. In addition, the Y-axis direction is also referred to as a side surface.

Configuration

A beverage container 100 in FIG. 1 is a container for accommodating a beverage (carbonated drink in the present embodiment) inside and includes, for example, a main body portion 101 and a lid portion 102 in FIG. 4.

Configuration—Main Body Portion

The main body portion 101 is an accommodating portion for accommodating a beverage and, specifically, is the part that is the main body of the beverage container 100. The main body portion 101 as a whole is, for example, circular in a plan view and includes a part that has a vacuum insulation structure made of metal such as stainless steel. It should be noted that the vacuum insulation structure is a concept including, for example, a structure in which a wall partitioning the inside and outside is dual for heat retention or cold retention enhancement.

The main body portion 101 includes, for example, a hollow portion 11 in FIG. 5, a spout 12 and the handle 13 in FIG. 1, a main body portion side opening portion 14, and a main body portion side engaging portion 15.

The hollow portion 11 in FIG. 5 is a space formed in the main body portion 101 and is a space where a beverage is accommodated.

The spout 12 in FIG. 1 is a part for pouring a beverage. As illustrated in FIG. 3, the spout 12 is, for example, a part provided on the front side (+X direction) opposite to the handle 13.

The handle 13 in FIG. 1 is a part that serves as a handle for a user to hold the beverage container 100. As illustrated in FIG. 3, the handle 13 is, for example, a part provided on the back side (–X direction) opposite to the spout 12.

The main body portion side opening portion 14 in FIG. 4 is an opening portion for putting a beverage into the main body portion 101. The main body portion side opening portion 14 is, for example, an opening portion circular in a plan view and open on the upper side (+Z direction) and communicates with the hollow portion 11 in FIG. 5. The lid portion 102 is detachably attached to the main body portion side opening portion 14.

The main body portion side engaging portion 15 in FIG. 1 is a structure for attaching the lid portion 102 to the main body portion 101 and is, for example, a screw groove provided in the inner surface of the main body portion side opening portion 14 as illustrated in FIG. 4.

Configuration—Lid Portion

FIG. 7 is a perspective view of the lid portion seen from above, FIG. 8 is a perspective view of the lid portion seen from below, FIG. 9 is a front view of the lid portion, FIG. 10 is a plan view of the lid portion, FIG. 11 is a bottom view of the lid portion, FIG. 12 is a side view of the lid portion, and FIG. 13 is an exploded perspective view of the lid portion.

The lid portion 102 in FIG. 4 is provided on the upper portion (+Z direction) of the main body portion 101 and is provided with, for example, a mechanism for making the beverage accommodated in the main body portion 101 dischargeable or non-dischargeable.

In other words, the lid portion 102 makes the beverage accommodated in the main body portion 101 dischargeable to the outside via a discharge port 215 (FIGS. 6 and 8) by, for example, opening the beverage opening portion 312 (FIG. 6) provided in the lower portion (–Z direction) of the lid portion 102. It should be noted that in this case, the gas opening portion 313 (FIG. 6) is opened and outside air is taken into the main body portion 101 via the gas opening portion 313.

In addition, the lid portion 102 makes the beverage accommodated in the main body portion 101 non-dischargeable by, for example, closing the beverage opening portion 312 (FIG. 6) provided in the lower portion (−Z direction) of the lid portion 102. It should be noted that in this case, the gas opening portion 313 (FIG. 5) is also closed.

The lid portion 102 in FIGS. 7 to 12 is, for example, circular in a plan view and is formed of resin, metal, or the like. The lid portion 102 includes, for example, a first part 102A and a second part 102B as illustrated in FIG. 13.

Configuration—First Part

FIG. 14 is a perspective view of the first part seen from above, FIG. 15 is a perspective view of the first part seen from below, FIG. 16 is a bottom view of the first part, FIG. 17 is an exploded perspective view of the first part seen from above, and FIG. 18 is an exploded perspective view of the first part seen from below.

The first part 102A in FIG. 13 is a part forming a part of the upper side (+X direction) of the lid portion 102 and is, for example, a part that can be attached to and detached from the second part 102B. The first part 102A includes, for example, a main body member 21, an operating member 22, an adjusting member 23, a guide member 24, and a connecting member 25 as illustrated in FIGS. 17 and 18.

Configuration—First Part—Main Body Member

FIG. 19 is a perspective view of the main body member seen from above, FIG. 20 is a perspective view of the main body member seen from below, and FIG. 21 is a bottom view of the main body member.

The main body member 21 in FIGS. 17 to 21 is a member forming the outer shape of the lid portion 102 and is a member accommodating various components of the lid portion 102. The main body member 21 is, for example, a member that is circular in a plan view and is a member that is formed of resin or the like as a whole. The main body member 21 includes, for example, an upper handle 210 in FIG. 19 and a lid portion side engaging portion 211, an opening portion 212, a positioning recess portion 213, a flow path portion 214, the discharge port 215, and a main body member side sealing material 216 in FIG. 20.

Configuration—First Part—Main Body Member—Upper Handle

The upper handle 210 in FIG. 19 is a metallic handle for a user to hold the lid portion 102 and is attached to, for example, a predetermined position of the main body member 21 by any method (for example, screwing method).

Configuration—First Part—Main Body Member—Lid Portion Side Engaging Portion

The lid portion side engaging portion 211 in FIGS. 19 and 20 is a structure for attaching the lid portion 102 to the main body portion 101 and is, for example, a structure that engages with the main body portion side engaging portion 15 in FIG. 4. The lid portion side engaging portion 211 is, for example, a screw thread provided on the outer surface of the main body member 21.

Configuration—First Part—Main Body Member—Opening Portion

The opening portion 212 in FIGS. 19 to 21 is an opening portion for exposing a part of the operating member 22 (FIG. 17) and is, for example, a circular opening portion provided near the middle of the main body member 21.

Configuration—First Part—Main Body Member—Positioning Recess Portion

The positioning recess portion 213 in FIG. 20 is a recess portion for positioning the rotation position of the operating member 22 (FIG. 17) with respect to the main body member 21 and is, for example, a recess portion provided at a part of the inner wall of the main body member 21 as illustrated in FIG. 20. It should be noted that although two positioning recess portions 213 are illustrated in FIG. 20, actually, two positioning recess portions are also provided at positions on the side opposite to the two positioning recess portions 213 in FIG. 20 with reference to the center of the main body member 21 in the horizontal direction and a total of four positioning recess portions are provided.

It should be noted that positioning the rotation position of the operating member 22 is a concept indicating, for example, positioning with respect to the angle at which the operating member 22 is rotated and, in the present embodiment, indicates positioning the operating member 22 at a position rotated by 90 degrees.

Configuration—First Part—Main Body Member—Flow Path Portion

The flow path portion 214 in FIG. 20 is a space that serves as a flow path for beverage discharge and leads to, for example, the discharge port 215.

Configuration—First Part—Main Body Member—Discharge Port

The discharge port 215 in FIG. 20 is a through hole for beverage discharge and is provided on, for example, the upper side (+Z direction) of the lid portion side engaging portion 211 in the main body member 21.

Configuration—First Part—Main Body Member—Main Body Member Side Sealing Material The main body member side sealing material 216 in FIG. 20 is a packing or a seal for maintaining watertightness and airtightness. The main body member side sealing material 216 is, for example, for preventing the beverage discharged from the discharge port 215 from leaking to the main body portion 101 (FIG. 4) side on the lower side (−Z direction). The main body member side sealing material 216 is, for example, a circular ring-shaped material provided along the outer surface of the main body member 21.

It should be noted that each sealing material described in the present embodiment can be configured in any manner and can be freely changed in material, shape, size, or number insofar as the material is configured so as to be capable of preventing an unexpected beverage or gas leakage in the beverage container 100. In addition, each sealing material may be formed by using rubber or may be formed by using any other material.

Configuration—First Part—Operating Member

FIG. 22 is a perspective view of the operating member seen from above, FIG. 23 is a perspective view of the operating member seen from below, and FIG. 24 is a plan view of the operating member.

The operating member 22 in FIGS. 17 to 18 and FIGS. 22 to 24 is a member for making a beverage dischargeable or non-dischargeable by opening or closing the beverage opening portion 312 and the gas opening portion 313 (FIG. 6) in a case where rotation is performed as a result of user operation. The operating member 22 is, for example, a member accommodated in the main body member 21 and is a member formed of resin or the like. The operating member 22 includes, for example, a knob portion 221 in FIG. 22 and a middle side protruding portion 222 and a positioning protruding portion 223 in FIG. 23.

Configuration—First Part—Operating Member—Knob Portion

The knob portion 221 in FIGS. 22 and 24 is a part that is gripped by a user. An external force for rotation is applied from the user to the knob portion 221. The knob portion 221 is, for example, a part exposed toward the upper side (+Z direction) via the opening portion 212 of the main body member 21 in FIG. 19.

Configuration—First Part—Operating Member—Middle Side Protruding Portion

The middle side protruding portion 222 in FIG. 23 is a part protruding toward the lower side (−Z direction) and has, for example, an outer surface provided with a screw thread 222A. The screw thread 222A is provided in a spiral shape so as to be capable of moving the adjusting member 23 (described later) screwed with the middle side protruding portion 222 of the operating member 22 to the upper side (+Z direction) or the lower side (−Z direction) in a case where the operating member 22 is rotated.

Configuration—First Part—Operating Member—Positioning Protruding Portion

The positioning protruding portion 223 in FIGS. 22 to 24 is a part for positioning the rotation position of the operating member 22 with respect to the main body member 21 (FIG. 20). For example, as illustrated in FIG. 23, the positioning protruding portion 223 is a part that is urged toward the outside of the operating member 22 in the horizontal direction by using a predetermined urging unit (for example, a compression coil spring generating, in the case of compression, an urging force based on the compression). The positioning protruding portion 223 is configured to face the inner peripheral wall in the main body member 21 provided with the positioning recess portion 213 (FIG. 20) in a case where the operating member 22 is accommodated in the main body member 21.

In a case where, for example, the operating member 22 is rotated by 90 degrees in one direction (clockwise or counterclockwise), the positioning protruding portion 223 faces the positioning recess portion 213 and protrudes, and the tip portion of the positioning protruding portion 223 is provided in the positioning recess portion 213. As a result, the operating member 22 is positioned at the rotated position.

In addition, in a case where, for example, the operating member 22 is rotated by 90 degrees clockwise in the other direction of clockwise or counterclockwise (direction opposite to "one direction"), the positioning protruding portion 223 faces the positioning recess portion 213 (positioning recess portion 213 provided next to the positioning recess portion 213 where the positioning protruding portion 223 was provided before the rotation) and protrudes, and the tip portion of the positioning protruding portion 223 is provided in the positioning recess portion 213. As a result, the operating member 22 is positioned at the rotated position.

In this manner, the operating member 22 can be positioned in a state of being rotated by 90 degrees with respect to the main body member 21.

Configuration—First Part—Adjusting Member

FIG. 25 is a perspective view of the adjusting member seen from above, FIG. 26 is a perspective view of the adjusting member seen from below, and FIG. 27 is a plan view of the adjusting member.

The adjusting member 23 in FIGS. 17 to 18 and FIGS. 25 to 27 is a member for moving the moving member 32 up and down by moving up and down in a case where the operating member 22 is rotated. The adjusting member 23 is, for example, a member accommodated in the main body member 21 and is a member formed of resin or the like. The adjusting member 23 includes, for example, an opening portion 231, a middle side protruding portion 232, and a guide protruding portion 233 in FIG. 26. It should be noted that "moving up and down" may be interpreted as indicating, for example, moving toward the upper side (+Z direction) or the lower side (−Z direction).

Configuration—First Part—Adjusting Member—Opening Portion

The opening portion 231 in FIGS. 25 to 27 is an opening portion through which the middle side protruding portion 222 (FIG. 23) of the operating member 22 is passed and communicates with, for example, the internal space of the middle side protruding portion 232 of the adjusting member 23.

Configuration—First Part—Adjusting Member—Middle Side Protruding Portion

The middle side protruding portion 232 in FIG. 26 is a part that protrudes toward the lower side (−Z direction). The middle side protruding portion 232 is provided with, for example, a hollow portion, and a screw groove 232A is provided in the inner surface of the hollow portion. The screw groove 232A is provided in a spiral shape so as to be screwed with the screw thread 222A of the middle side protruding portion 222 of the operating member 22 (FIG. 23).

Configuration—First Part—Adjusting Member—Guide Protruding Portion

The guide protruding portion 233 in FIGS. 25 to 27 is a part for moving the adjusting member 23 up and down while preventing the adjusting member 23 from rotating. For example, the guide protruding portion 233 is a part that protrudes toward the outside from the center side of the adjusting member 23 in the horizontal direction.

Configuration—First Part—Guide Member

FIG. 28 is a perspective view of the guide member seen from above, FIG. 29 is a perspective view of the guide member seen from below, and FIG. 30 is a plan view of the guide member.

The guide member 24 in FIGS. 17 to 18 and FIGS. 28 to 30 is a member for attaching the operating member 22 and the adjusting member 23 to the main body member 21 and is a member guiding the upward and downward movement of the adjusting member 23. The guide member 24 is, for example, a member accommodated in the main body member 21 and is a member formed of resin or the like. The guide member 24 includes, for example, an opening portion 241 and a middle side protruding portion 242 in FIG. 28 and a screw hole 243 in FIG. 29.

Configuration—First Part—Guide Member—Opening Portion

The opening portion 241 in FIGS. 28 to 30 is an opening portion provided with at least a part of the adjusting member 23 and is, for example, a circular opening portion provided near the middle of the guide member 24.

Configuration—First Part—Guide Member—Middle Side Protruding Portion

The middle side protruding portion 242 in FIGS. 28 and 29 is a part that protrudes toward the lower side (−Z direction) and is provided with, for example, a hollow portion. The hollow portion of the middle side protruding portion 242 is, for example, a space where the adjusting member 23 is provided, and a guide recess portion 242A is provided in the inner surface thereof. The guide recess portion 242A is a recess portion for moving the adjusting member 23 up and down while preventing the adjusting member 23 from rotating. For example, the guide recess portion 242A is provided with the tip portion of the guide protruding portion 233 (FIG. 25) of the adjusting member 23.

Configuration—First Part—Guide Member—Screw Hole

The screw hole 243 in FIGS. 29 and 30 is a screw hole for attaching and fixing the guide member 24 to the main body member 21 and is, for example, a screw hole into which a fixing screw 901 in FIGS. 17 and 18 is screwed.

Configuration—First Part—Connecting Member

FIG. 31 is a perspective view of the connecting member seen from below.

The connecting member 25 in FIGS. 17 to 18 and FIG. 31 is a member that detachably attaches and connects the first part 102A (FIG. 13) of the lid portion 102 to the second part 102B of the lid portion 102. The connecting member 25 is, for example, a member that is circular in a plan view and is a member formed of resin or the like as a whole. The connecting member 25 includes, for example, a first opening portion 251, a second opening portion 252, a connecting member side first sealing material 253, and a connecting member side second sealing material 254 in FIG. 31.

Configuration—First Part—Connecting Member—First Opening Portion

The first opening portion 251 in FIG. 31 is an opening portion provided near the middle of the connecting member 25 and is, for example, an opening portion provided next to the second opening portion 252.

Configuration—First Part—Connecting Member—Second Opening Portion

The second opening portion 252 in FIG. 31 is an opening portion for beverage discharge and is, for example, an opening portion where watertightness is maintained with respect to the first opening portion 251.

Configuration—First Part—Connecting Member—Connecting Member Side First Sealing Material The connecting member side first sealing material 253 in FIG. 31 is a packing or a seal for maintaining watertightness and airtightness and is, for example, for preventing the beverage and gas accommodated in the hollow portion 11 (FIG. 5) of the main body portion 101 from leaking from between the lid portion 102 and the main body portion 101. The connecting member side first sealing material 253 is, for example, a circular ring-shaped material provided along the lower (−Z direction) outer peripheral edge of the connecting member 25.

Configuration—First Part—Connecting Member—Connecting Member Side Second Sealing Material The connecting member side second sealing material 254 in FIG. 31 is a packing or a seal for maintaining watertightness and airtightness and is, for example, for preventing the beverage discharged to the second opening portion 252 side from leaking to the outside of the second opening portion 252. The connecting member side second sealing material 254 is provided in, for example, the lower portion (−Z direction) at the outer peripheral edges of the first opening portion 251 and the second opening portion 252.

Configuration—Second Part

FIG. 32 is a perspective view of the second part seen from above, FIG. 33 is a perspective view of the second part seen from below, FIG. 34 is a front view of the second part, FIG. 35 is an exploded perspective view of the second part seen from above, and FIG. 36 is an exploded perspective view of the second part seen from below.

The second part 102B in FIG. 13 is a part forming a part of the lower side (+X direction) of the lid portion 102 and is, for example, a part that can be attached to and detached from the first part 102A. The second part 102B includes, for example, a partition member 31, the moving member 32, an urging member 33, and an attachment member 34 as illustrated in FIGS. 35 and 36.

Configuration—Second Part—Partition Member

FIG. 37 is a perspective view of the partition member seen from above, and FIG. 38 is a perspective view of the partition member seen from below.

The partition member 31 in FIGS. 37 and 38 is a member that separates the inside and the outside of the main body portion 101 in the main body portion side opening portion 14 in FIG. 4. The partition member 31 is, for example, a member that is circular in a plan view and is a plate-shaped member formed of resin or the like as a whole. The partition member 31 includes, for example, a middle side opening portion 311, the beverage opening portion 312, the gas opening portion 313, and a pressure-reducing valve 314 in FIG. 37 and a guide portion 315 in FIG. 38.

Configuration—Second Part—Partition Member—Middle Side Opening Portion

The middle side opening portion 311 in FIGS. 37 and 38 is an opening portion through which a middle side protruding portion 322 (described later) of the moving member 32 is passed and is, for example, an opening portion provided at the center of the partition member 31 in the horizontal direction.

Configuration—Second Part—Partition Member—Beverage Opening Portion

The beverage opening portion 312 in FIGS. 37 and 38 is an opening portion for beverage discharge from the main body portion 101 and is, for example, a circular opening portion having a predetermined diameter.

Configuration—Second Part—Partition Member—Gas Opening Portion

The gas opening portion 313 in FIGS. 37 and 38 is an opening portion for taking outside air into the main body portion 101. In the present embodiment, as illustrated in FIGS. 37 and 38, the gas opening portion 313 is provided at a position on the side opposite to the installation position of the beverage opening portion 312 with reference to the center of the partition member 31 in the horizontal direction (that is, the middle side opening portion 311). In addition, as the gas opening portion 313, for example, three circular opening portions smaller in diameter than the beverage opening portion 312 are provided.

It should be noted that the configurations of the gas opening portion 313 and the beverage opening portion 312 can be freely changed and, for example, the opening portions can be freely changed in shape, size, number, installation position, and so on.

Configuration—Second Part—Partition Member—Pressure-Reducing Valve

The pressure-reducing valve 314 in FIGS. 37 and 38 is a pressure-reducing unit for reducing the pressure in the main body portion 101. It should be noted that watertightness and airtightness are maintained in the hollow portion 11 (FIG. 5) of the main body portion 101, the pressure in the hollow portion 11 in a case where a carbonated drink as a beverage is accommodated in the hollow portion 11 rises by the carbonated drink foaming, and yet the pressure in the hollow portion 11 can be appropriately reduced to be maintained at a predetermined pressure or less or the predetermined pressure since the pressure-reducing valve 314 is provided.

The pressure-reducing valve 314 can be of any type and configuration. For example, the pressure-reducing valve 314 can be configured by using a known pressure-reducing valve technique such that an opening or gap is closed after the opening or gap is opened and pressure reduction is performed in a case where the internal pressure of the hollow portion 11 exceeds a predetermined pressure.

Configuration—Second Part—Partition Member—Guide Portion

The guide portion 315 in FIG. 38 is a part for guiding the upward and downward movement of the moving member 32 and is, for example, a part protruding from both sides of the middle side opening portion 311 toward the lower side (−Z direction).

Configuration—Second Part—Moving Member

FIG. 39 is a perspective view of the moving member seen from above, FIG. 40 is a perspective view of the moving member seen from below, and FIG. 41 is a side view of the moving member.

The moving member 32 in FIGS. 39 and 40 is a member that moves a beverage opening and closing portion side sealing material 324 and a gas opening and closing portion side sealing material 325 up and down to open and close the beverage opening portion 312 and the gas opening portion 313 in FIG. 6 with the respective sealing materials. The moving member 32 is, for example, a member formed of resin or the like as a whole. As illustrated in FIG. 8, a part of the moving member 32 is exposed on the lower side (−Z direction) of the lid portion 102. The moving member 32 includes, for example, a main body portion 321, the middle side protruding portion 322, a fixing piece 323, the beverage opening and closing portion side sealing material 324, the gas opening and closing portion side sealing material 325, and a protruding portion side sealing material 326 in FIG. 39.

Configuration—Second Part—Moving Member—Main Body Portion

The main body portion 321 in FIGS. 39 to 41 is a part extending in the horizontal direction.

Configuration—Second Part—Moving Member—Middle Side Protruding Portion

The middle side protruding portion 322 in FIGS. 39 to 41 is a part that protrudes toward the upper side (+Z direction) from the center of the main body portion 321 in the horizontal direction.

Configuration—Second Part—Moving Member—Fixing Piece

As illustrated in FIG. 32, the fixing piece 323 in FIGS. 39 to 41 is a part where the attachment member 34 urged and pushed toward the upper side (+Z direction) by the urging member 33 is fixed and attached.

Configuration—Second Part—Moving Member—Beverage Opening and Closing Portion Side Sealing Material The beverage opening and closing portion side sealing material 324 in FIGS. 39 to 41 is a beverage opening and closing member that opens and closes the beverage opening portion 312 in FIG. 6, 37, or the like from the lower side (−Z direction) of the beverage opening portion 312. Specifically, the beverage opening and closing portion side sealing material 324 is a member that blocks and closes the beverage opening portion 312 or releases the blocking and opens the beverage opening portion 312. The beverage opening and closing portion side sealing material 324 is a packing or a seal for maintaining watertightness and airtightness. For example, the beverage opening and closing portion side sealing material 324 protrudes toward the upper side (+Z direction) in the end portion on the front side (+X direction)

in the main body portion 321 and is larger in diameter than the beverage opening portion 312 in a plan view.

Configuration—Second Part—Moving Member—Gas Opening and Closing Portion Side Sealing Material The gas opening and closing portion side sealing material 325 in FIGS. 39 to 41 is a gas opening and closing member that opens and closes the gas opening portion 313 in FIG. 6, 37, or the like from the lower side (−Z direction) of the gas opening portion 313. Specifically, the gas opening and closing portion side sealing material 325 is a member that blocks and closes every gas opening portion 313 or releases the blocking and opens every gas opening portion 313. The gas opening and closing portion side sealing material 325 is a packing or a seal for maintaining watertightness and airtightness. For example, the gas opening and closing portion side sealing material 325 protrudes toward the upper side (+Z direction) in the end portion of the main body portion 321 on the back side (−X direction). In addition, the gas opening and closing portion side sealing material 325 has, for example, a diameter at which every gas opening portion 313 (FIG. 37) can be blocked.

Configuration—Second Part—Moving Member—Protruding Portion Side Sealing Material The protruding portion side sealing material 326 in FIGS. 39 to 41 is a packing or a seal for maintaining watertightness and airtightness. For example, the protruding portion side sealing material 326 is for preventing the beverage and gas accommodated in the hollow portion 11 (FIG. 5) of the main body portion 101 from leaking from between the middle side protruding portion 322 of the moving member 32 and the partition member 31 in the middle side opening portion 311 of the partition member 31 in FIG. 37. The protruding portion side sealing material 326 is, for example, a circular ring-shaped material provided along the outer surface on the lower side (−Z direction) of the middle side protruding portion 322.

It should be noted that the main body portion 321 and the middle side protruding portion 322 in the moving member 32 may be interpreted as corresponding to "moving member".

Configuration—Second Part—Urging Member

The urging member 33 in FIGS. 35 and 36 is a member that urges and pushes the moving member 32 toward the upper side (+Z direction) via the attachment member 34 with respect to the partition member 31. For example, the urging member 33 can be configured by using an elastic element such as a spring. The urging member 33 is provided between, for example, the partition member 31 and the attachment member 34 in the longitudinal direction (Z-axis direction) as illustrated in FIGS. 32 and 34.

Configuration—Second Part—Attachment Member

The attachment member 34 in FIGS. 35 and 36 is a member for attaching the urging member 33 to the moving member 32 and is, for example, a member that is circular in a plan view and is formed of resin or the like. The attachment member 34 includes, for example, an opening portion 341 and a fixing recess portion 342 in FIG. 35.

Configuration—Second Part—Attachment Member—Opening Portion

The opening portion 341 in FIGS. 35 and 36 is an opening portion through which the upper end portion (+Z direction) of the middle side protruding portion 322 of the moving member 32 is passed and is, for example, an opening portion provided at the center of the attachment member 34 in the horizontal direction.

Configuration—Second Part—Attachment Member—Fixing Recess Portion

The fixing recess portion 342 in FIG. 35 is a part where the fixing piece 323 of the moving member 32 is fixed from the upper side (+Z direction) and is, for example, a part provided around the opening portion 341 in the upper surface (+Z direction) of the attachment member 34.

(Lid Portion Assembly Method)

Next, a method for assembling the lid portion 102 will be described. For example, the method for assembling the lid portion 102 will be described after describing a method for assembling the first part 102A in FIG. 13 and a method for assembling the second part 102B in FIG. 13.

(Lid Portion Assembly Method—First Part)

First, the method for assembling the first part 102A in FIG. 13 will be described. It should be noted that the order of assembly of the components described below may be freely changed (the same applies to the assembly of other parts).

First, the adjusting member 23 is attached to the operating member 22 in FIGS. 17 and 18. For example, the middle side protruding portion 222 of the operating member 22 in FIG. 23 is provided in the middle side protruding portion 232 through the opening portion 231 of the adjusting member 23 in FIG. 25. In this case, the screw thread 222A of the operating member 22 in FIG. 23 is provided in the screw groove 232A of the adjusting member 23 in FIG. 25, and the middle side protruding portion 222 of the operating member 22 is screwed into the adjusting member 23.

Next, the operating member 22 and adjusting member 23 are attached to the main body member 21 using the guide member 24 in FIGS. 17 and 18. For example, the guide protruding portion 233 of the adjusting member 23 in FIG. 25 is provided in the guide recess portion 242A of the guide member 24 in FIG. 28 by providing the adjusting member 23 in the middle side protruding portion 242 of the guide member 24 in FIG. 28. Next, the fixing screw 901 in FIGS. 17 and 18 is continuously screwed and fixed to the screw hole 243 of the guide member 24 in FIG. 29 and the screw hole of the main body member 21 in FIGS. 17 and 18.

Next, the connecting member 25 in FIGS. 17 and 18 is attached to the lower end portion (−Z direction) of the main body member 21. This attachment can be performed by any method. For example, the attachment may be performed using an engaging structure with each member provided with the engaging structure that allows the members to be mutually attached in a detachable manner. As a result of the above, the assembly of the first part 102A of the lid portion 102 in FIGS. 14 to 16 is completed.

(Lid Portion Assembly Method—Second Part)

Next, the method for assembling the second part 102B in FIG. 13 will be described.

First, the moving member 32 in FIGS. 35 and 36 is provided on the partition member 31. For example, the middle side protruding portion 322 of the moving member 32 in FIG. 39 is provided through the middle side opening portion 311 of the partition member 31 in FIG. 38.

Next, the urging member 33 in FIGS. 35 and 36 is provided. For example, a spring that is the urging member 33 in FIG. 35 is provided from the upper side (+Z direction) around the middle side protruding portion 322 of the moving member 32 protruding to the upper side (+Z direction) via the middle side opening portion 311 in FIG. 38. It should be noted that in this case, the lower end portion (−Z direction) of the urging member 33 is placed at the part around the middle side opening portion 311 in the partition member 31.

Next, the attachment member 34 in FIGS. 35 and 36 is attached. For example, in a state where the urging member 33 provided around the middle side protruding portion 322 of the moving member 32 is compressed, the upper portion side (+Z direction) of the middle side protruding portion 322 of the moving member 32 is inserted through the opening portion 341 of the attachment member 34 to rotate the attachment member 34, and the fixing piece 323 of the moving member 32 is provided in the fixing recess portion 342 of the attachment member 34 as a result. It should be noted that in this case, as illustrated in FIGS. 32 and 34, the spring that is the urging member 33 is provided in a compressed state between the partition member 31 and the attachment member 34. As a result of the above, the assembly of the second part 102B of the lid portion 102 in FIGS. 32 to 34 is completed.

(Lid Portion Assembly Method—Lid Portion)

Next, the second part 102B is attached to the first part 102A in FIG. 13. This attachment can be performed by any method. For example, the attachment may be performed using an engaging structure with each part provided with the engaging structure that allows the parts to be mutually attached in a detachable manner. As a result of the above, the assembly of the lid portion 102 in FIGS. 7 to 12 is completed.

Operation

Next, the operation of the lid portion 102 will be described. For example, the operation of the lid portion 102 will be described after describing the operation of the first part 102A and the operation of the second part 102B.

Operation—First Part

First, the operation of the first part 102A in FIGS. 14 to 16 will be described.

For example, in a case where the operating member 22 in FIG. 14 is rotated by 90 degrees in one direction, the middle side protruding portion 222 of the operating member 22 also rotates by 90 degrees in one direction. In this case, since the guide protruding portion 233 in FIG. 25 is provided in the guide recess portion 242A of the guide member 24 in FIG. 28, the adjusting member 23 screwed to the middle side protruding portion 222 moves to, for example, the lower side (−Z direction) and protrudes based on the above rotation.

Subsequently, in a case where the operating member 22 in FIG. 14 is rotated back by 90 degrees in the other direction, for example, the middle side protruding portion 222 of the operating member 22 also rotates by 90 degrees in the other direction. In this case, since the guide protruding portion 233 in FIG. 25 is provided in the guide recess portion 242A of the guide member 24 in FIG. 28, the adjusting member 23 screwed to the middle side protruding portion 222 moves to, for example, the upper side (+Z direction) and retracts based on the above rotation.

Operation—Second Part

Next, the operation of the second part 102B in FIGS. 32 to 34 will be described.

For example, in a case where no external force is applied to the second part 102B, the attachment member 34 is moved toward the upper side (+Z direction) with respect to the partition member 31 by the urging force of the urging member 33 in FIG. 34. In this case, since the fixing piece 323 of the moving member 32 is provided on the upper surface of the attachment member 34 (specifically, the fixing recess portion 342 (FIG. 35)), the fixing piece 323 is pushed toward the upper side (+Z direction) by the attachment member 34 and the moving member 32 moves to the upper side (+Z direction). Then, the beverage opening and closing portion side sealing material 324 (FIG. 41) and the gas opening and closing portion side sealing material 325 of the moving member 32 are pressed from the lower side (−Z direction) of the partition member 31 to the positions corresponding to the beverage opening portion 312 and the gas opening portion 313 in the partition member 31, and the opening portions are respectively blocked by the sealing materials. In other words, the beverage opening portion 312 and the gas opening portion 313 are simultaneously blocked and closed.

In addition, in a case where the middle side protruding portion 322 of the moving member 32 is pushed toward the lower side (−Z direction), for example, the moving member 32 moves to the lower side against the urging force of the urging member 33 in FIG. 34. In this case, the beverage opening and closing portion side sealing material 324 (FIG. 41) and the gas opening and closing portion side sealing material 325 of the moving member 32 are separated from the partition member 31, and thus the blocking of the beverage opening portion 312 and the gas opening portion 313 is released. In other words, the beverage opening portion 312 and the gas opening portion 313 are simultaneously released from blocking and opened.

It should be noted that since the main body portion 321 of the moving member 32 moves up and down between the two guide portions 315 in the partition member 31 in FIG. 38, it is possible to prevent the moving member 32 from deviating in the lateral direction (direction in which the guide portion 315 is provided) in moving, and thus each opening portion can be opened and closed appropriately.

Operation—Lid Portion

Next, the operation of the lid portion 102 in FIGS. 7 to 12 will be described. FIGS. 42 and 43 are cross-sectional views of a part of the beverage container. It should be noted that FIGS. 42 and 43 are cross-sectional views similar to FIGS. 5 and 6.

For example, in a case where the operating member 22 in FIG. 7 is rotated by 90 degrees in one direction, the adjusting member 23 moves toward the lower side (−Z direction) as described above. In this case, as indicated by the arrow A2 in FIG. 43, the moving member 32 is pushed by the adjusting member 23 and moves to the lower side (−Z direction), the beverage opening and closing portion side sealing material 324 and the gas opening and closing portion side sealing material 325 are separated from the partition member 31, and thus the beverage opening portion 312 and the gas opening portion 313 are released from blocking and opened.

It should be noted that the positions of the sealing materials (for example, the positions in FIG. 43) where the beverage opening and closing portion side sealing material 324 and the gas opening and closing portion side sealing material 325 are separated from the partition member 31 and the respective opening portions are open may be interpreted as corresponding to the "beverage opening and closing member side second position" and the "gas opening and closing member side second position".

Subsequently, in a case where the operating member 22 in FIG. 7 is rotated by 90 degrees in the other direction, for example, the adjusting member 23 moves toward the upper side (+Z direction) as described above. In this case, as indicated by the arrow A1 in FIG. 42, the moving member 32 is moved to the upper side (−Z direction) by the urging force of the urging member 33, the beverage opening and closing portion side sealing material 324 and the gas opening and closing portion side sealing material 325 are pressed against the partition member 31, and thus the beverage opening portion 312 and the gas opening portion 313 are blocked and closed.

It should be noted that the positions of the sealing materials (for example, the positions in FIG. 42) where the beverage opening and closing portion side sealing material 324 and the gas opening and closing portion side sealing material 325 are pressed against the partition member 31 and the respective opening portions are closed may be interpreted as corresponding to the "beverage opening and closing member side first position" and the "gas opening and closing member side first position".

Method for Use

Next, how to use the beverage container 100 will be described.

First, as illustrated in FIG. 4, the lid portion 102 is removed from the main body portion 101, and a beverage is put into and accommodated in the hollow portion 11 of the main body portion 101 via the main body portion side opening portion 14. Next, the lid portion 102 is attached to the main body portion 101.

Next, as illustrated in FIG. 42, the operating member 22 is rotated by 90 degrees in the other direction to block and close the beverage opening portion 312 and the gas opening portion 313.

In this case, since the beverage opening portion 312 and the gas opening portion 313 are closed and watertightness and airtightness are maintained, the beverage accommodated in the hollow portion 11 is not discharged even when the beverage container 100 is tilted. In addition, although the beverage foams and the pressure in the hollow portion 11 increases since the beverage is a carbonated drink, the pressure is reduced via the pressure-reducing valve 314 in a case where a predetermined pressure is exceeded, and thus the pressure in the hollow portion 11 can be maintained at a predetermined pressure or so. In addition, since the beverage opening and closing portion side sealing material 324 and the gas opening and closing portion side sealing material 325 close the respective opening portions from the lower side of the partition member 31, the closed states of the opening portions can be reliably maintained even when the pressure in the hollow portion 11 is increased.

Next, as illustrated in FIG. 43, the operating member 22 is rotated by 90 degrees in one direction to release the blocking and open the beverage opening portion 312 and the gas opening portion 313.

In this case, the hollow portion 11 of the main body portion 101 leads to the discharge port 215 via the beverage opening portion 312 and the flow path portion 214, and thus the beverage accommodated in the hollow portion 11 can be discharged from the vicinity of the spout 12 in FIG. 1 via the beverage opening portion 312, the flow path portion 214, and the discharge port 215 in a case where the beverage container 100 is tilted. It should be noted that in this case, since the gas opening portion 313 is open, outside air is taken into the hollow portion 11 via the gas opening portion 313 and an internal space 21A (FIG. 43) of the lid portion 102 with airtightness not maintained, and the beverage can be reliably discharged from the beverage opening portion 312 side. It should be noted that regarding the internal space 21A, outside air is taken in via between the components where airtightness is not maintained (for example, the gap between the main body member 21 and the operating member 22 or the adjusting member 23).

As described above, a beverage can be accommodated and kept in the beverage container 100 and the beverage can be discharged from the beverage container 100.

Effect of Embodiment

As described above, according to the present embodiment, by providing the beverage opening and closing portion side sealing material 324 for opening and closing the beverage opening portion 312 from the lower side of the beverage opening portion 312, it is possible to make a beverage dischargeable or non-dischargeable in accordance with, for example, a user's intention.

In addition, by providing the gas opening and closing portion side sealing material 325 for opening and closing the gas opening portion 313 from the lower side of the gas opening portion 313, beverage discharge via, for example, the gas opening portion 313 can be prevented.

In addition, by moving the beverage opening and closing portion side sealing material 324 to the beverage opening and closing member side first position and moving the gas opening and closing portion side sealing material 325 to the gas opening and closing member side first position or moving the beverage opening and closing portion side sealing material 324 to the beverage opening and closing member side second position and moving the gas opening and closing portion side sealing material 325 to the gas opening and closing member side second position, outside air can be taken in when, for example, the beverage is discharged, and thus the beverage can be discharged smoothly. In addition, for example, both opening portions can be closed, and thus beverage discharge can be reliably prevented.

In addition, by providing the pressure-reducing valve 314, it is possible to prevent, for example, the pressure in the main body portion 101 from continuing to rise, and thus safety can be maintained.

In addition, since the beverage is an effervescent beverage, the effervescent beverage can be, for example, made dischargeable or non-dischargeable in accordance with a user's intention. In particular, in a case where, for example, the pressure in the main body portion 101 rises by the beverage foaming, it is possible to prevent the beverage opening and closing portion side sealing material 324 from deviating to open the beverage opening portion 312 against the user's intention based on the pressure, and thus the beverage can be reliably made dischargeable or non-dischargeable in accordance with the user's intention.

Embodiment-Related Modification Example

Although an embodiment according to the invention has been described above, the specific configuration and means of the invention can be modified and improved in any manner within the scope of the technical idea of each invention described in the claims. Hereinafter, such a modification example will be described.

(Regarding Problem to be Solved and Effect of Invention)

First, the problem to be solved by the invention and the effect of the invention are not limited to the content described above and may differ depending on the implementation environment and configuration details of the invention, and the problem described above may be resolved only in part or the effect described above may be achieved only in part.

(Regarding Materials)

In addition, the materials described in the embodiment may be freely changed. For example, those made of metal may be changed to those made of resin or another material in whole or in part or those made of resin may be changed to those made of metal or another material in whole or in part.

(Regarding Attachment Method)

In addition, the components of the lid portion 102 of the embodiment are mutually attachable by any attachment method. For example, the components may be configured to be attached by engagement, may be configured to be attached by screwing, or may be configured to be fixed and attached with an adhesive or the like.

(Regarding Moving Member Moving Mechanism)

In addition, the invention is not limited to the embodiment in which a case where the moving member 32 is moved up and down by rotating the operating member 22 is described. For example, in an alternative configuration, the moving member 32 may be moved up and down by an operation lever that moves up and down being provided and the operation lever being moved up and down.

(Regarding Each Member)

In addition, each member described in the embodiment may be integrally configured. For example, the main body member 21 and the connecting member 25 in FIG. 17 may be integrally configured.

(Regarding Features)

In addition, the configuration of the embodiment and the features of the modification example may be combined in any manner.

One embodiment of the present invention provides a beverage container comprises: an accommodating portion for accommodating a beverage; and a lid portion provided on an upper portion of the accommodating portion, wherein the lid portion includes: a beverage opening portion for discharging the beverage accommodated in the accommodating portion; and a beverage opening and closing member for opening and closing the beverage opening portion from a lower side of the beverage opening portion.

According to this embodiment, by providing the beverage opening and closing member for opening and closing the beverage opening portion from the lower side of the beverage opening portion, it is possible to make a beverage dischargeable or non-dischargeable in accordance with, for example, a user's intention.

Another embodiment of the present invention provides the beverage container according to the above embodiment, wherein the lid portion further includes: a gas opening portion provided separately from the beverage opening portion and for taking outside air into the accommodating portion in a case where the beverage accommodated in the accommodating portion is discharged; and a gas opening and closing member for opening and closing the gas opening portion from a lower side of the gas opening portion.

According to this embodiment, by providing the gas opening and closing member for opening and closing the gas opening portion from the lower side of the gas opening portion, beverage discharge via, for example, the gas opening portion can be prevented.

Another embodiment of the present invention provides the beverage container according to the above embodiment, wherein the beverage opening and closing member is movable to a beverage opening and closing member side first position for blocking and closing the beverage opening portion and a beverage opening and closing member side second position for releasing the blocking and opening the beverage opening portion, the gas opening and closing member is movable to a gas opening and closing member side first position for blocking and closing the gas opening portion and a gas opening and closing member side second position for releasing the blocking and opening the gas opening portion, the lid portion includes a moving member for moving the beverage opening and closing member and the gas opening and closing member in synchronization with each other, and the moving member moves the beverage opening and closing member to the beverage opening and closing member side first position and moves the gas opening and closing member to the gas opening and closing member side first position or moves the beverage opening and closing member to the beverage opening and closing member side second position and moves the gas opening and closing member to the gas opening and closing member side second position.

According to this embodiment, by moving the beverage opening and closing member to the beverage opening and closing member side first position and moving the gas opening and closing member to the gas opening and closing member side first position or moving the beverage opening and closing member to the beverage opening and closing member side second position and moving the gas opening and closing member to the gas opening and closing member side second position, outside air can be taken in when, for example, the beverage is discharged, and thus the beverage can be discharged smoothly. In addition, for example, both opening portions can be closed, and thus beverage discharge can be reliably prevented.

Another embodiment of the present invention provides the beverage container according to the above embodiment, wherein the lid portion further includes a pressure-reducing unit for reducing pressure in the accommodating portion.

According to this embodiment, by providing the pressure-reducing unit, it is possible to prevent, for example, the pressure in the accommodating portion from continuing to rise, and thus safety can be maintained.

Another embodiment of the present invention provides the beverage container according to the above embodiment, wherein the beverage is an effervescent beverage.

According to this embodiment, since the beverage is an effervescent beverage, the effervescent beverage can be, for example, made dischargeable or non-dischargeable in accordance with a user's intention. In particular, in a case where, for example, the pressure in the accommodating portion rises by the beverage foaming, it is possible to prevent the beverage opening and closing member from deviating to open the beverage opening portion against the user's intention based on the pressure, and thus the beverage can be reliably made dischargeable or non-dischargeable in accordance with the user's intention.

Another embodiment of the present invention provides a lid portion of a beverage container including an accommodating portion for accommodating a beverage and the lid portion provided on an upper portion of the accommodating portion, the lid portion comprises: a beverage opening portion for discharging the beverage accommodated in the accommodating portion; and a beverage opening and closing member for opening and closing the beverage opening portion from a lower side of the beverage opening portion.

According to this embodiment, by providing the beverage opening and closing member for opening and closing the beverage opening portion from the lower side of the beverage opening portion, it is possible to make a beverage dischargeable or non-dischargeable in accordance with, for example, a user's intention.

REFERENCE SIGNS LIST

11 Hollow portion
12 Spout
13 Handle
14 Main body portion side opening portion
15 Main body portion side engaging portion
21 Main body member
21A Internal space
22 Operating member
23 Adjusting member
24 Guide member
25 Connecting member
31 Partition member
32 Moving member
33 Urging member
34 Attachment member
100 Beverage container
101 Main body portion
102 Lid portion
102A First part
102B Second part
210 Upper handle
211 Lid portion side engaging portion
212 Opening portion
213 Positioning recess portion
214 Flow path portion
215 Discharge port
216 Main body member side sealing material
221 Knob portion
222 Middle side protruding portion
222A Screw thread
223 Positioning protruding portion
231 Opening portion
232 Middle side protruding portion
232A Screw groove
233 Guide protruding portion
241 Opening portion
242 Middle side protruding portion
242A Guide recess portion
243 Screw hole
251 First opening portion
252 Second opening portion
253 Connecting member side first sealing material
254 Connecting member side second sealing material
311 Middle side opening portion
312 Beverage opening portion
313 Gas opening portion
314 Pressure-reducing valve
315 Guide portion
321 Main body portion
322 Middle side protruding portion
323 Fixing piece
324 Beverage opening and closing portion side sealing material
325 Gas opening and closing portion side sealing material
326 Protruding portion side sealing material
341 Opening portion
342 Fixing recess portion
901 Fixing screw
A1 Arrow
A2 Arrow

The invention claimed is:
1. A beverage container comprising:
an accommodating portion for accommodating a beverage; and
a lid portion provided on an upper portion of the accommodating portion,
wherein the lid portion includes:
a beverage opening portion for discharging the beverage accommodated in the accommodating portion; and
a beverage opening and closing member for opening and closing the beverage opening portion from a lower side of the beverage opening portion,
wherein the lid portion further includes:
a gas opening portion provided separately from the beverage opening portion and for taking outside air into the accommodating portion in a case where the beverage accommodated in the accommodating portion is discharged; and
a gas opening and closing member for opening and closing the gas opening portion from a lower side of the gas opening portion,
wherein the beverage opening and closing member is movable to a beverage opening and closing member side first position for blocking and closing the beverage opening portion and a beverage opening and closing member side second position for releasing the blocking and opening the beverage opening portion,
wherein the gas opening and closing member is movable to a gas opening and closing member side first position for blocking and closing the gas opening portion and a gas opening and closing member side second position for releasing the blocking and opening the gas opening portion,
wherein the lid portion includes:
an operating member which is rotated to a first rotation position or a second rotation position by an external force applied from a user; and
a moving member for moving the beverage opening and closing member and the gas opening and closing member in synchronization with each other,
wherein the moving member comprises a main body portion extending in a horizontal direction,
wherein the beverage opening and closing member protrudes toward the upper side from one end of the main body,
wherein the gas opening and closing member protrudes toward the upper side from other end of the main body,
wherein, if the operating member is rotated to the first rotation position, the moving member moves to the upper side, causing the beverage opening and closing member to move to the beverage opening and closing member side first position and causing the gas opening and closing member to move to the gas opening and closing member side first position, wherein, if the operating member is rotated to the second rotation position, the moving member moves to the lower side, causing the beverage opening and closing member to move to the beverage opening and closing member side second position and causing the gas opening and closing member to move to the gas opening and closing member side second position, wherein the lid portion includes a positioning protruding portion that positions the operating member at least in the second rotation position if the operating member is rotated to the second rotation position and the external force is not applied to the operating member, wherein the lid portion includes two guide portions for guiding the upward and downward movement of the moving member, wherein the main body of the moving member is located between the two guide portions.

2. The beverage container according to claim 1, wherein the lid portion further includes a pressure-reducing unit for reducing pressure in the accommodating portion.

3. The beverage container according to claim 1, wherein the beverage is an effervescent beverage.

4. A lid portion of a beverage container including an accommodating portion for accommodating a beverage and the lid portion provided on an upper portion of the accommodating portion, the lid portion comprising:

a beverage opening portion for discharging the beverage accommodated in the accommodating portion; and a beverage opening and closing member for opening and closing the beverage opening portion from a lower side of the beverage opening portion wherein the lid portion further includes:

a gas opening portion provided separately from the beverage opening portion and for taking outside air into the accommodating portion in a case where the beverage accommodated in the accommodating portion is discharged; and a gas opening and closing member for opening and closing the gas opening portion from a lower side of the gas opening portion, wherein the beverage opening and closing member is movable to a beverage opening and closing member side first position for blocking and closing the beverage opening portion and a beverage opening and closing member side second position for releasing the blocking and opening the beverage opening portion, wherein the gas opening and closing member is movable to a gas opening and closing member side first position for blocking and closing the gas opening portion and a gas opening and closing member side second position for releasing the blocking and opening the gas opening portion, wherein the lid portion includes:

an operating member which is rotated to a first rotation position or a second rotation position by an external force applied from a user; and a moving member for moving the beverage opening and closing member and the gas opening and closing member in synchronization with each other, wherein the moving member comprises a main body portion extending in a horizontal direction, wherein the beverage opening and closing member protrudes toward the upper side from one end of the main body, wherein the gas opening and closing member protrudes toward the upper side from other end of the main body, wherein, if the operating member is rotated to the first rotation position, the moving member moves to the upper side, causing the beverage opening and closing member to move to the beverage opening and closing member side first position and causing the gas opening and closing member to move to the gas opening and closing member side first positions, wherein, if the operating member is rotated to the second rotation position, the moving member moves to the lower side, causing the beverage opening and closing member to move to the beverage opening and closing member side second position and causing the gas opening and closing member to move to the gas opening and closing member side second position, wherein the lid portion includes a positioning protruding portion that positions the operating member at least in the second rotation position if the operating member is rotated to the second rotation position and the external force is not applied to the operating member, wherein the lid portion includes two guide portions for guiding the upward and downward movement of the moving member, wherein the main body of the moving member is located between the two guide portions.

* * * * *